US012804172B2

(12) United States Patent
Ma et al.

(10) Patent No.: US 12,804,172 B2
(45) **Date of Patent: *Nov. 17, 2026**

(54) CROSS COMPONENT ADAPTIVE LOOP FILTER FOR VIDEO CODING

(71) Applicant: BEIJING DAJIA INTERNET INFORMATION TECHNOLOGY CO., LTD., Beijing (CN)

(72) Inventors: Tsung-Chuan Ma, Beijing (CN); Xianglin Wang, Beijing (CN); Yi-Wen Chen, Beijing (CN); Xiaoyu Xiu, Beijing (CN); Hong-Jheng Jhu, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 22 days.

This patent is subject to a terminal disclaimer.

(21) Appl. No.: 19/059,096

(22) Filed: Feb. 20, 2025

(65) Prior Publication Data

US 2025/0211761 A1 Jun. 26, 2025

Related U.S. Application Data

(63) Continuation of application No. 17/843,868, filed on Jun. 17, 2022, now Pat. No. 12,262,029, which is a (Continued)

(51) Int. Cl.
*H04N 19/186* (2014.01)
*H04N 19/117* (2014.01)
*H04N 19/172* (2014.01)

(52) U.S. Cl.
CPC ......... *H04N 19/186* (2014.11); *H04N 19/117* (2014.11); *H04N 19/172* (2014.11)

(58) Field of Classification Search
None
See application file for complete search history.

(56) References Cited

U.S. PATENT DOCUMENTS

2005/0200630 A1 9/2005 Evans et al.
2015/0341648 A1 11/2015 Auyeung (Continued)

FOREIGN PATENT DOCUMENTS

CN 109600611 A 4/2019
CN 109691102 A 4/2019

(Continued)

OTHER PUBLICATIONS

Beijing Dajia Internet Information Technology Co., Ltd., International Search Report and Written Opinion, PCT/US2020/066168, Apr. 13, 2021, 7 pgs.

(Continued)

*Primary Examiner* — Peter D Le
(74) *Attorney, Agent, or Firm* — MASCHOFF BRENNAN; Ran Pang; Liang Huang

(57) ABSTRACT

This application is directed to processing video data that includes a plurality of luma samples and a plurality of chroma samples corresponding to a plurality of pixel groups of a video frame. For each pixel group, an electronic device identifies a respective chroma sample and a set of luma samples and determines an anchor luma sample according to a predefined rule. A chroma refinement value is generated based on the set of luma samples by: obtaining a difference between a respective luminance value of each luma sample in the set and an anchor luminance value of the anchor luma sample, applying a cross component filter to the differences of the set of luma samples to obtain a cross component filtering result, and performing a non-linear clipping operation based on the cross component filtering result. The (Continued)

electronic device derives a value of the respective chroma sample using the chroma refinement value.

20 Claims, 16 Drawing Sheets

Related U.S. Application Data continuation of application No. PCT/US2020/066168, filed on Dec. 18, 2020.

(60) Provisional application No. 62/950,060, filed on Dec. 18, 2019.

(56) References Cited

U.S. PATENT DOCUMENTS

| | | | |
|---|---|---|---|
| 2016/0105685 | A1 | 4/2016 | Zou et al. |
| 2016/0173881 | A1 | 6/2016 | Alshina et al. |
| 2019/0246140 | A1 | 8/2019 | Sasai et al. |
| 2019/0306517 | A1 | 10/2019 | Strom et al. |
| 2021/0044834 | A1 | 2/2021 | Li et al. |
| 2021/0067793 | A1 | 3/2021 | Hu et al. |
| 2021/0076032 | A1 | 3/2021 | Hu et al. |
| 2021/0084295 | A1 | 3/2021 | Chen et al. |
| 2021/0084340 | A1 | 3/2021 | Li et al. |
| 2021/0160513 | A1 | 5/2021 | Hu et al. |
| 2022/0248007 | A1 | 8/2022 | Misra et al. |

FOREIGN PATENT DOCUMENTS

| | | | |
|---|---|---|---|
| CN | 115176480 | A | 10/2022 |
| CN | 115550667 | A | 12/2022 |
| CN | 117241020 | A | 12/2023 |
| CN | 117241021 | A | 12/2023 |
| WO | 2019183946 | A1 | 10/2019 |
| WO | 2021127534 | A1 | 6/2021 |

OTHER PUBLICATIONS

Ching-Yeh Chen et al., "Description of Core Experiment 5 (CE5): Cross Component Adaptative Loop Filtering," JVET-P2025-v4, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.

Beijing Dajia Internet Information Technology Co., Ltd., EP20902777.0, Supplementary European Search Report, Jan. 4, 2023, 5 pgs.

Beijing Dajia Internet Information Technology Co., Ltd., EP20902777.0, Communication pursuant to Article 94(3) EPC, Jan. 16, 2023, 10 pgs.

Zhang et al.; "CE5-related: On the CC-ALF filtering process", Input document to JVET, Proposal, Joint Video Experts Team (JVET), of ITU-T SG 16 WP 3 and ISO/IEC JTC 1/SC 29/WG 11, Document: JVET-Q0165-v1, 17th Meeting: Brussels, BE, Jan. 7-17, 2020, 6 pgs.

Wang et al.; "Non-CE5: On CC-ALF padding for ALF virtual boundaries", Input document to JVET, Proposal, Joint Video Experts Team (JVET), of ITU-T SG 16 WP 3 and ISO/IEC JTC 1/SC 29/WG 11, Document: JVET-Q0311, 17th Meeting: Brussels, BE Jan. 7-17, 2020, 6 pgs.

Misra et al.; "CE5-2.1, CE5-2.2: Cross Component Adaptive Loop Filter", Input document to JVET, Proposal, Joint Video Experts Team (JVET), of ITU-T SG 16 WP 3 and ISO/IEC JTC 1/SC 29/WG 11, Document: JVET-P0080, 16th Meeting: Geneva, CH, Oct. 1-11, 2019, 7 pgs.

Misra et al.; "CE5-related: On the design of CC-ALF", Input document to JVET, Proposal, Joint Video Experts Team (JVET), of ITU-T SG 16 WP 3 and ISO/IEC JTC 1/SC 29/WG 11, Document: JVET-P1008-v2, 16th Meeting: Geneva, CH, Oct. 1-11, 2019, 6 pgs.

Chen et al.; "Algorithm description for Versatile Video Coding and Test Model 7 (VTM 7)", Output document of JVET, Algorithm description for Versatile Video Coding and Test Model 7, Joint Video Experts Team (JVET), of ITU-T SG 16 WP 3 and ISO/IEC JTC 1/SC 29/WG 11, Document: JVET-P2002-v1, 16th Meeting: Geneva, CH, Oct. 1-11, 2019, 90 pgs.

Communication of May 4, 2024 informing about the maintenance of the oral proceedings scheduled on Sep. 4, 2024 for EP Patent Application No. 20902777.0, 5 pages.

Misra (Sharplabs) K, et al., "CE5-Related: Reducing multiplier count in CC-ALF", 16. JVET Meeting; Oct. 1, 2019-Oct. 11, 2019; Geneva; (The Joint Video Exploration Team of ISO/IEC JTC1/SC29/WG11 and ITU-T SG.16 ), No. JVET-P0468, Sep. 25, 2019 (Sep. 25, 2019), XP030217398; Retrieved from the Internet: http://phenix.int-evry.fr/jvet/doc_end_user/documents/16_Geneva/wg11/?JVET-P0468-v1.zip JVET-P0468.docx, [retrieved on Sep. 25, 2019], 4 pages.

Misra (Sharplabs) K et al., "CE5-Related: Reducing multiplier count in CC-ALF",16. JVET Meeting; Oct. 1, 2019-Oct. 11, 2019; Geneva; (The Joint Video Exploration Team of ISO/IEC JTC1/SC29/WG11 and ITU-T SG.16 ), No. JVET-P0468 ; m50436, Sep. 25, 2019 (Sep. 25, 2019), XP030217396; Retrieved from the Internet: URL: http://phenix.int-evry.fr/jvet/doc_end_user/documents/16_Geneva/wg11/?JVET-P0468-v1.zip JVET-P0468.docx [retrieved on Sep. 25, 2019], 470 pages.

CROSS COMPONENT ADAPTIVE LOOP FILTER FOR VIDEO CODING

CROSS-REFERENCE TO RELATED APPLICATIONS

The present application is a continuation application of U.S. patent application Ser. No. 17/843,868, filed Jun. 17, 2022, which is a continuation of International Application No. PCT/US2020/066168, entitled "Cross Component Adaptive Loop Filter for Video Coding" filed on Dec. 18, 2020 and published as International Publication No. WO 2021/127534. The International Application claims priority to U.S. Provisional Application No. 62/950,060, entitled "Cross Component Adaptive Loop Filter for Video Coding" filed on Dec. 18, 2019. The entire disclosures of all of the afore-mentioned patent applications are incorporated herein by reference.

TECHNICAL FIELD

The present application generally relates to video data coding and compression, and in particular, to method and system of improvement in coding of chroma and luma components of an image frame in a bitstream of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

In-loop filtering is applied on a reconstructed CU before it is put in a reference picture store and used to code other video blocks. Adaptive Loop Filters (ALF) are applied for chroma and luma components of the reconstructed CU, respectively, while a cross component filter can be applied to make use of the luma components to refine the chroma components of the CU. It would be beneficial to have a more efficient coding mechanism to encode and decode these color components while maintaining the image quality of the decoded video data.

SUMMARY

This application describes implementations related to video data encoding and decoding and, more particularly, to method and system of improvement in coding of chroma and luma components of a video frame based on cross component adaptive filtering. Each chroma component of the video frame is filtered based on a plurality of surrounding chroma components and refined based on a set of adjacent luma components. Specifically, an anchor luma component is identified and deducted from the set of adjacent luma components to form a set of difference luma components, allowing each chroma component to be refined using a combination of the difference luma components corresponding to the set of adjacent luma components.

In one aspect, a method of coding video data includes obtaining, from a bitstream, a plurality of luma samples and a plurality of chroma samples corresponding to a plurality of pixel groups of a video frame. The method further includes for each of the plurality of pixel groups, identifying a respective chroma sample and a set of luma samples in the pixel group and determining an anchor luma sample from the set of luma samples according to a predefined anchoring rule. Each luma sample has a respective luminance value, and the anchor luma sample has an anchor luminance value. The method further includes for each pixel group, generating a chroma refinement value based on the set of luma samples, updating the respective chroma sample using the chroma refinement value, and storing the updated respective chroma sample of each pixel group in association with the video frame. For each pixel group, generating the chroma refinement value further includes differencing the respective luminance value of each luma sample in the set of luma samples by the anchor luminance value and applying a cross component filter to the difference luminance values of the set of luma samples to generate the chroma refinement value.

In some embodiments, the plurality of pixel groups includes a first subset of pixels and a second subset of pixels immediately adjacent to the first subset of pixels, the method further includes determining that the first subset of pixels and the second subset of pixels are divided by a virtual boundary of a block and replacing luminance values of luma samples corresponding to the second subset of pixels with luminance values of luma samples corresponding to the first subset of pixels. The first subset of pixels is enclosed in the block by the virtual boundary. In some situations, the luma samples of the first subset of pixels are available for use (e.g., stored with the block) and immediately adjacent to the virtual boundary of the block, and the luma samples of the second subset of pixels are not available (e.g., not stored with the block). Further, in some embodiments, for at least one pixel group, the chroma refinement value is generated based on the luminance value of the replaced luma sample corresponding to at least one of the second subset of pixels.

In another aspect, an electronic device includes one or more processors and memory for storing instructions, which when executed by the one or more processors cause the electronic device to perform the methods of coding video data as described above.

In yet another aspect, a non-transitory computer readable storage medium stores has instructions stored thereon, which when executed by one or more processors of an electronic device cause the one or more processors to perform the methods of coding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
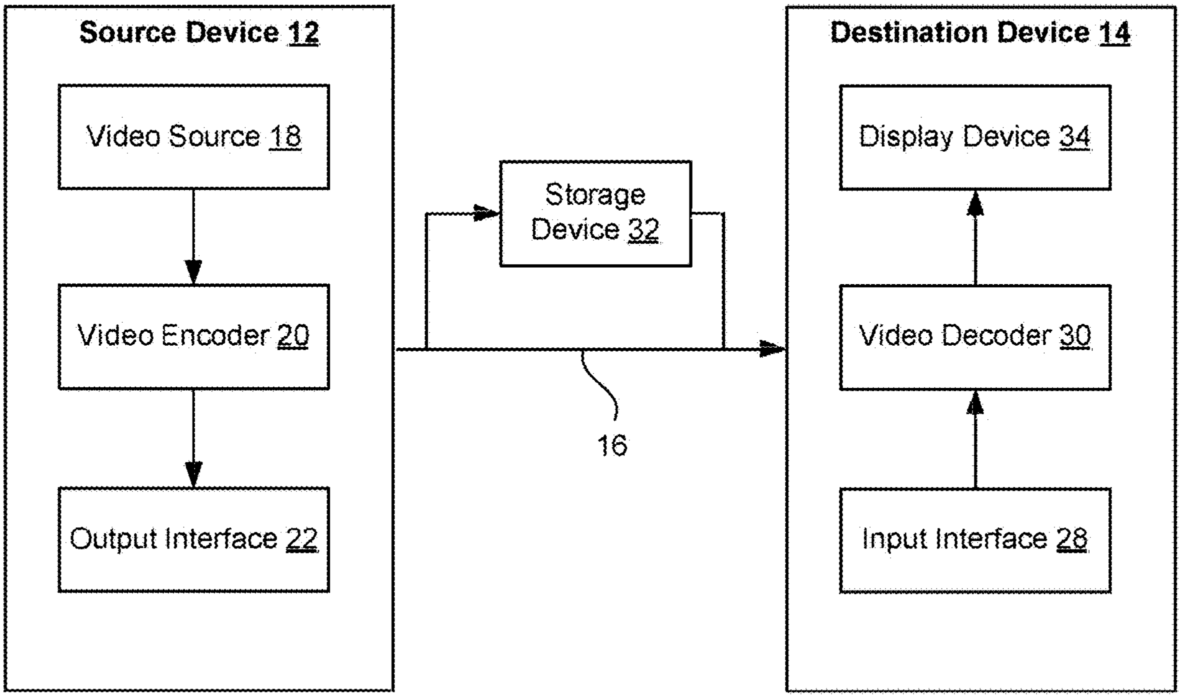
FIG. 1 is a block diagram illustrating an exemplary video encoding and decoding system, in accordance with some embodiments.

FIG. 1 is a block diagram illustrating an exemplary system 10 for encoding and decoding video blocks in parallel, in accordance with some embodiments. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
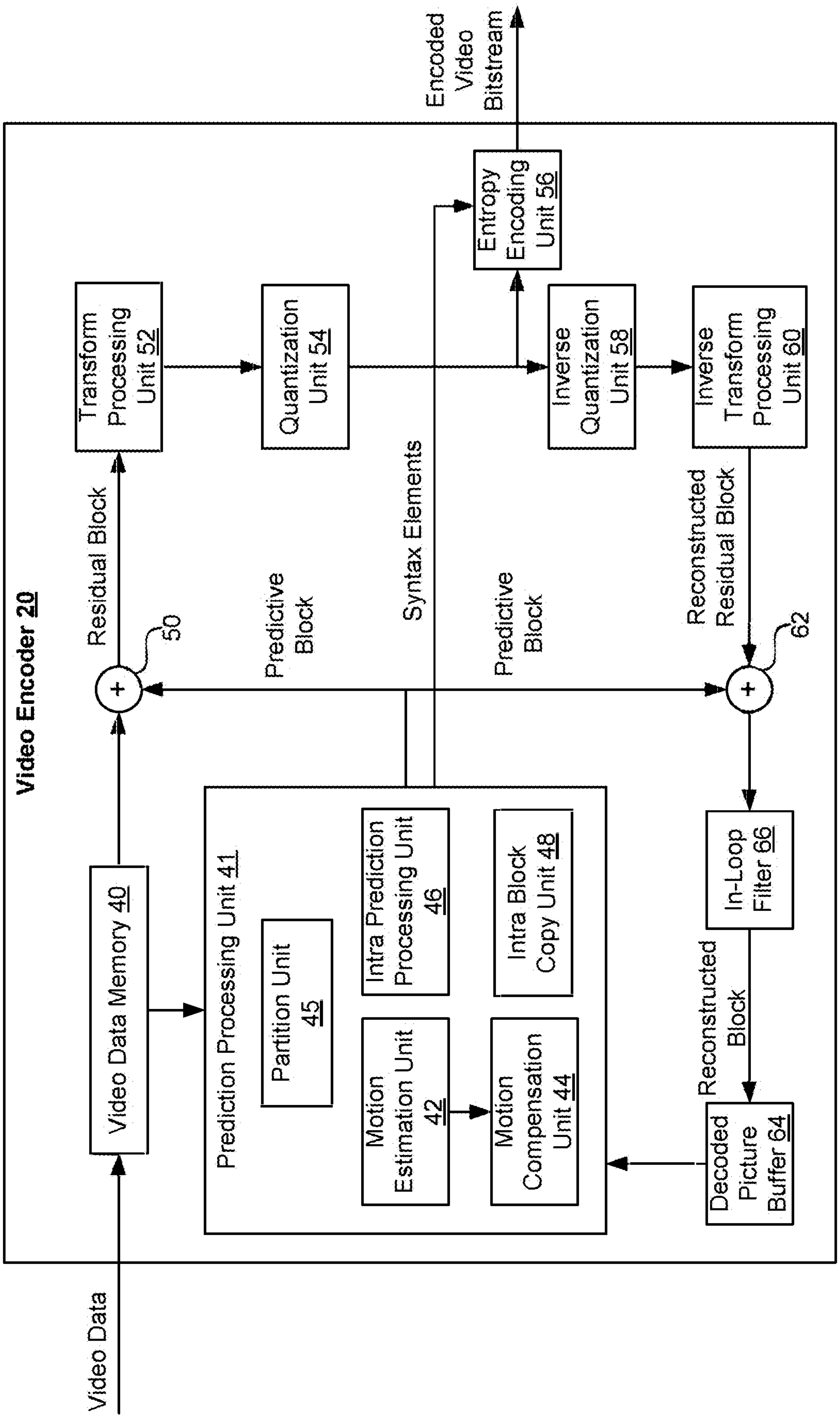
FIG. 2 is a block diagram illustrating an exemplary video encoder, in accordance with some embodiments.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. An in-loop filter 66 may be positioned between summer 62 and DPB 64, and includes a deblocking filter to filter block boundaries and remove blockiness artifacts from reconstructed video. The in-loop filter 66 further includes a sample adaptive offset (SAO) and adaptive in-loop filter (ALF) to filter the output of summer 62 before the output of summer 62 is put into DPB 64 and used to code other video blocks. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block.

Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
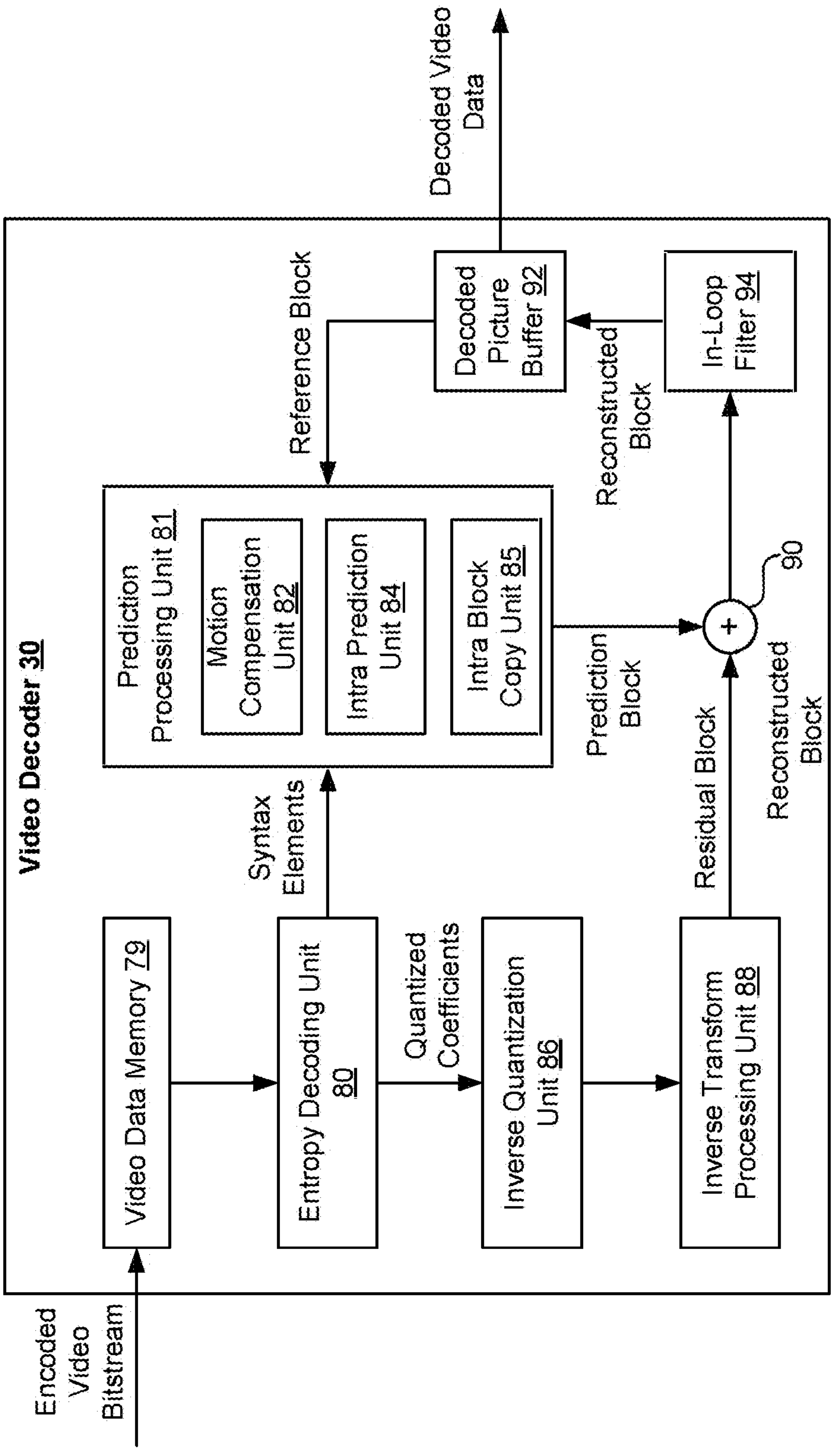
FIG. 3 is a block diagram illustrating an exemplary video decoder, in accordance with some embodiments.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter 94 may be positioned between summer 90 and DPB 92, and includes a deblocking filter to filter block boundaries and remove blockiness artifacts from the decoded video block. The in-loop filter 94 further includes a SAO filter and an ALF to filter the decoded video block outputted by summer 90. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
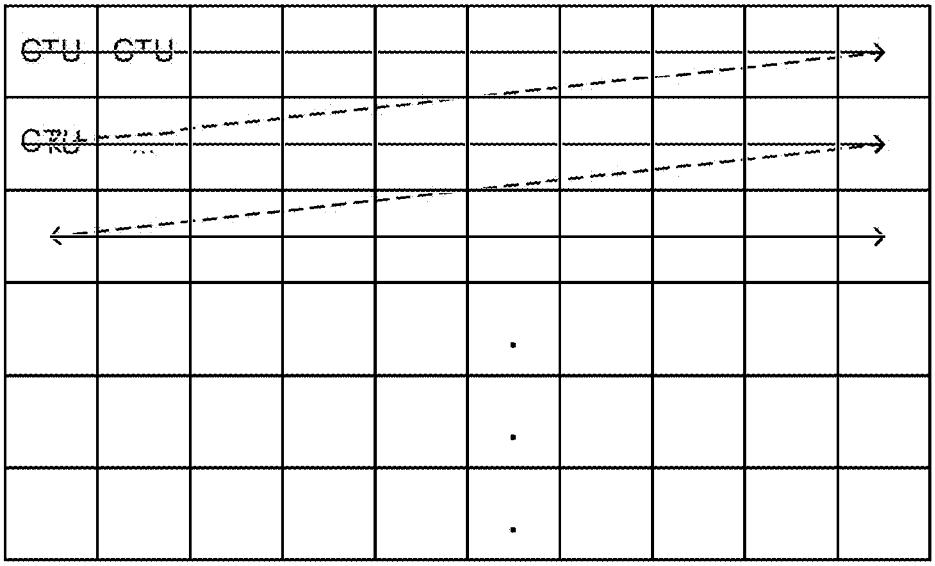
FIGS. 4A-4E are schematic diagrams to recursively partition an image frame into video blocks of different sizes and shapes, in accordance with some embodiments.
Figure 4B:
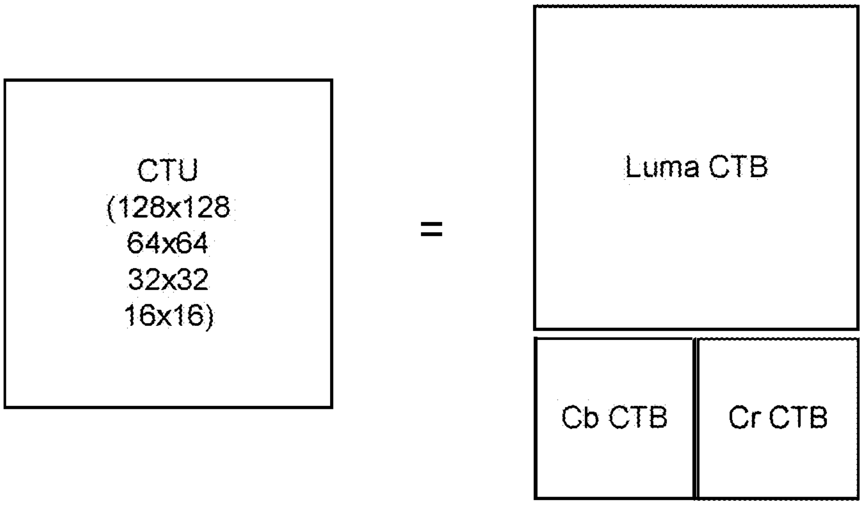

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
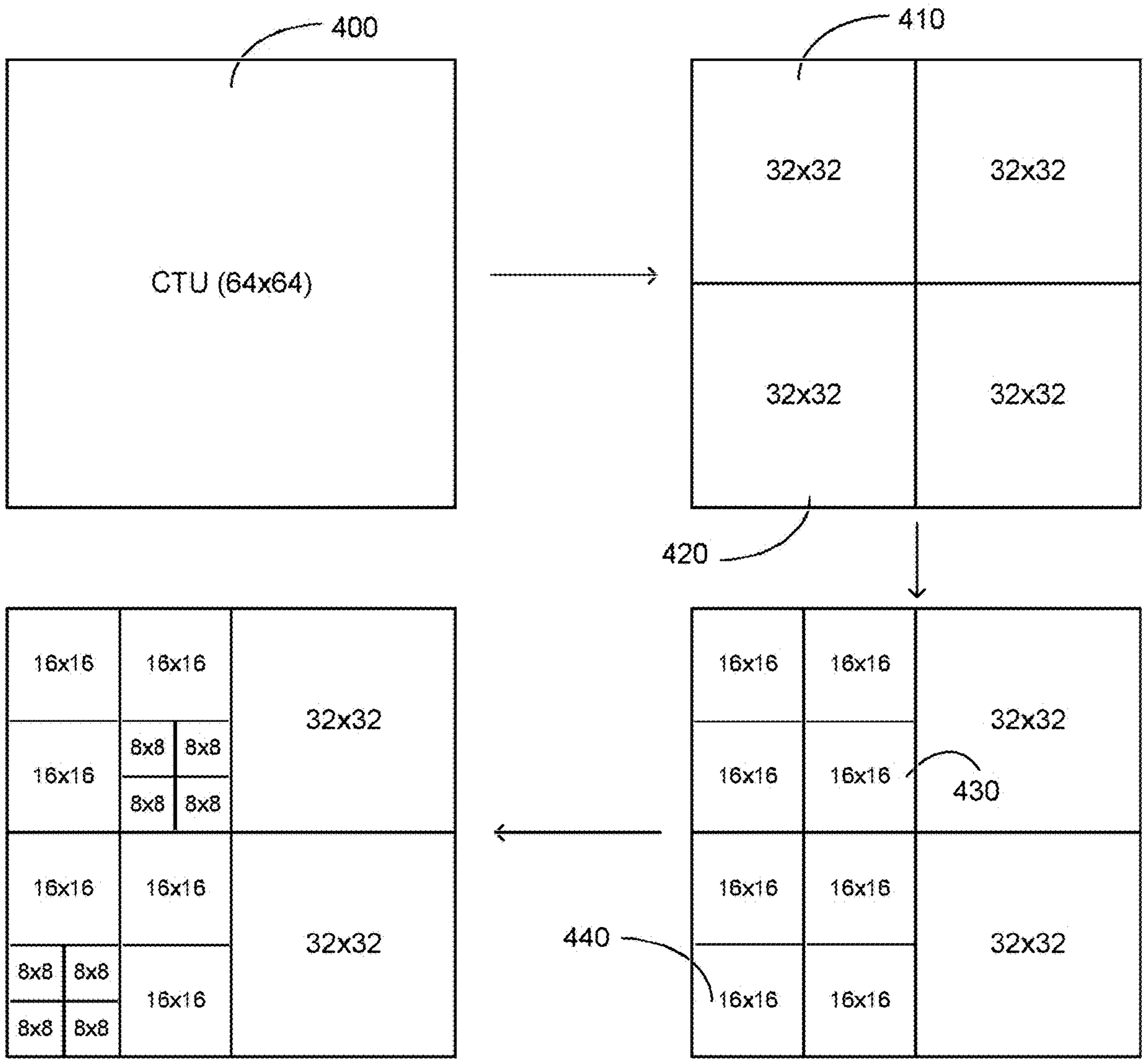
Figure 4D:
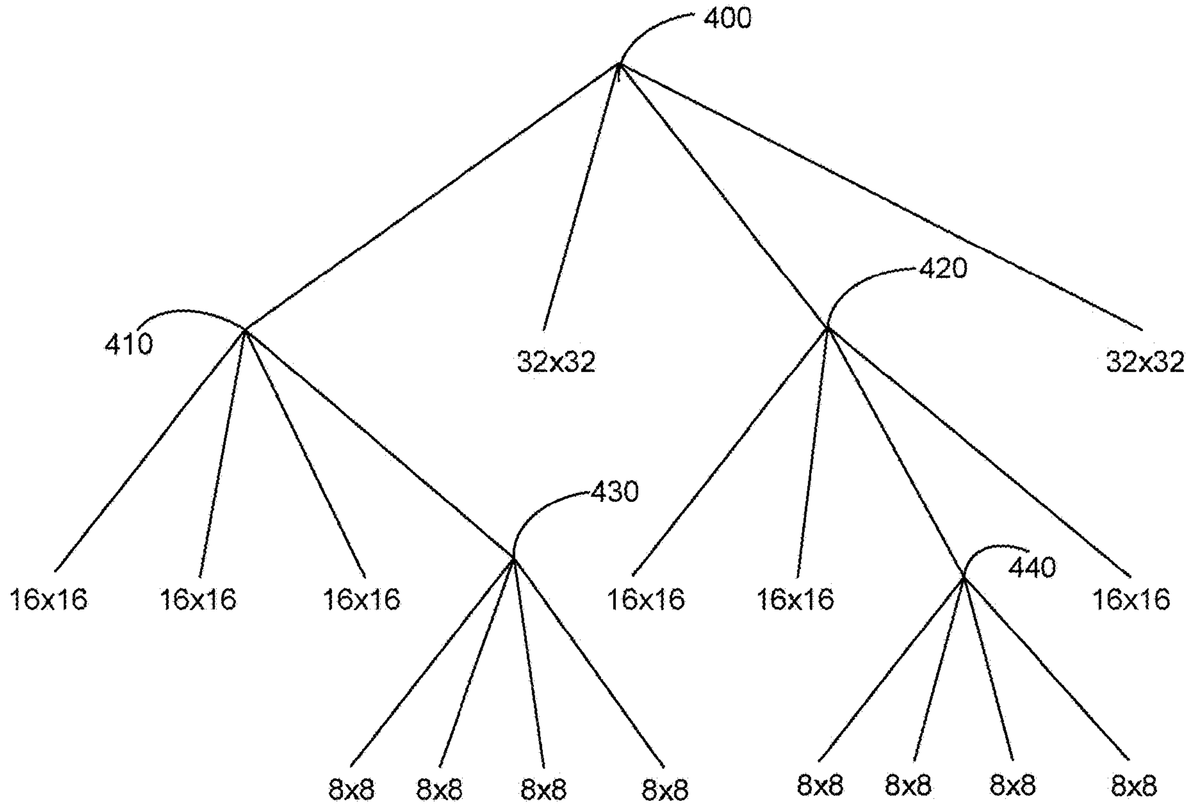
Figure 4E:
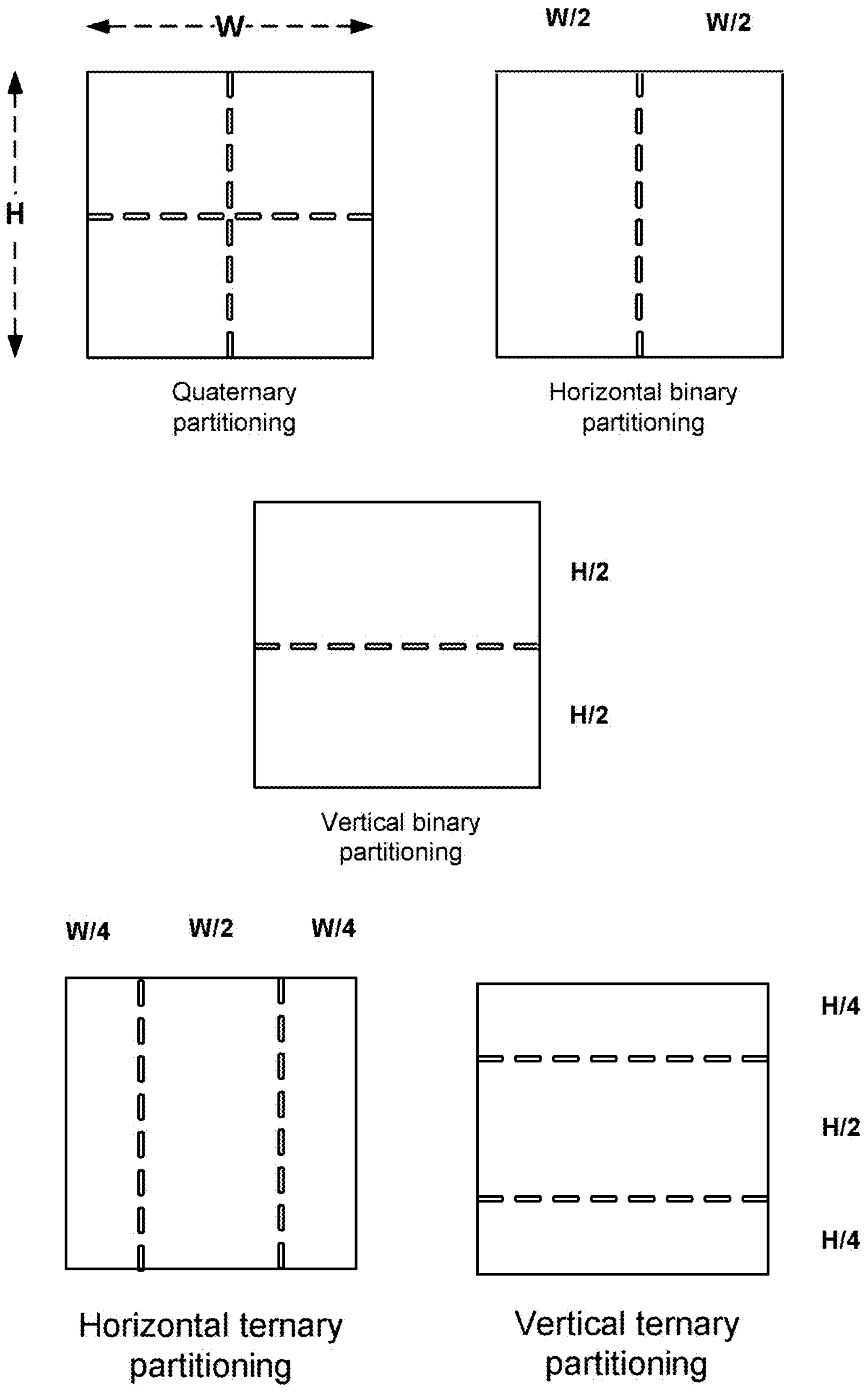

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5:
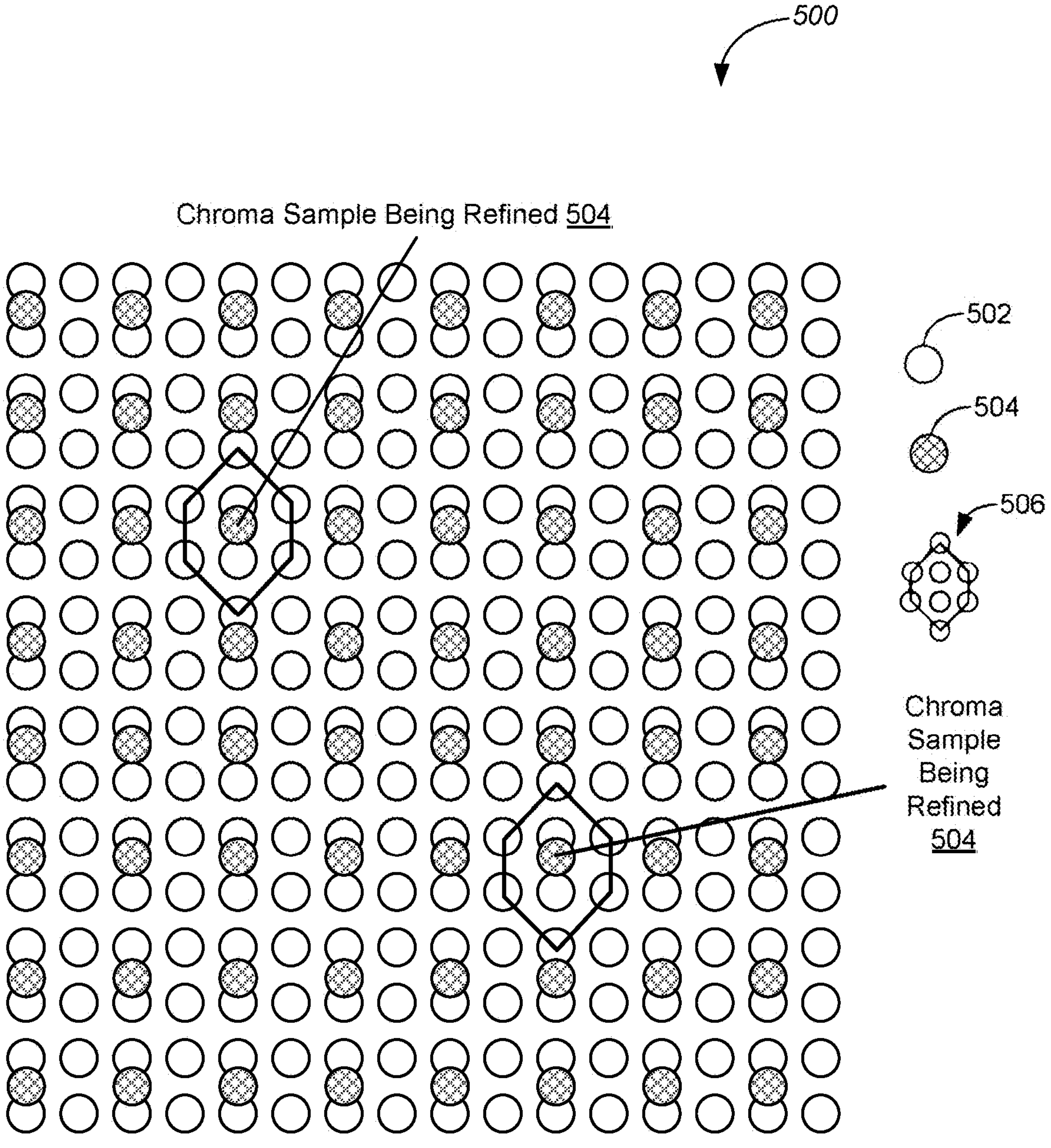
FIG. 5 illustrates a portion of a video frame in a bitstream, in accordance with some embodiments.

FIG. 5 illustrates a portion of a video frame 500 in a bitstream, in accordance with some embodiments. The video frame 500 includes a plurality of pixels, and each pixel is made of a plurality of color elements (e.g., blue, green and red). In video encoding and decoding, color information of the plurality of pixels is represented by a plurality of luma samples 502 and a plurality of chroma samples 504. Each of the plurality of pixels corresponds to a respective luma sample 502, and each luma sample 502 also corresponds to a respective pixel in the video frame 500. Each chroma sample 504 corresponds to a respective set of luma samples 502 according to a subsampling scheme. Each luma sample has a luma component Y', and each chroma sample 504 has a blue-difference chroma component Cb and a red-difference chroma component Cr. The subsampling scheme of the luma and chroma components (Y': Cb: Cr) has a three-part ratio, e.g., 4:1:1, 4:2:0, 4:2:2, 4:4:4, and 4:4:0. Specifically, the luma samples 502 and chroma samples 504 of the video frame 500 comply with the subsampling scheme having the three-part ratio equal to 4:1:1, and on average, every four luma samples 502 correspond to one chroma sample 504 having the blue-difference chroma component Cb and the red-difference chroma component Cr.

In video encoding or encoding, each of the luma samples 502 and chroma samples 504 are reconstructed from residual blocks of the video frame 500 and filtered by a deblocking filter, an SAO filter, and an ALF filter of an in-loop filter 66 or 94 to remove artifacts. The filtered luma samples 502 and chroma samples 504 are stored into a decoded picture buffer 64 or 92 and used to code or decode other video blocks in the video frame 500. In some embodiments, each of the deblocking, SAO and ALF filters is configured to filter the luma samples 502 or chroma samples 504 based on the same type of samples, e.g., filter each luma sample 502 based on a respective set of adjacent luma samples 502 and filter each luma sample 502 based on a respective set of adjacent chroma samples 504. In some embodiments, the in-loop filter 66 or 94 further includes a cross component filter configured to filter each chroma sample 504 based on one or more luma samples 502 that are adjacent to the respective chroma sample 504. Conversely, in some embodiments, the in-loop filter 66 or 94 includes an alternative cross component filter configured to filter each luma sample 502 based on one or more luma samples 502 that are adjacent to the respective luma sample 502.

Specifically, a cross component filter includes a cross component ALF that is configured to refine each chroma sample 504 based on the one or more luma samples 502 that are adjacent to the respective chroma sample 504. For example, the cross component ALF is a linear, diamond-shaped filter. For each chroma sample 504, one or more adjacent luma samples 502 includes eight luma samples 502 corresponding to a pixel group 506 having eight pixels. Six of the eight luma samples 502 form a hexagon that encloses the respective chroma sample 504 and two remainder luma samples 502. Each chroma sample 504 corresponds to a chroma refinement value that is a linear combination of luma values of the eight luma samples 502 according to the linear and diamond-shaped cross component ALF. In accordance with such a diamond-shaped filter, each luma sample 502 of the video frame 500 can be used for cross component filtering of more than one chroma sample 504. More details of specific examples of cross component ALFs are discussed below with reference to FIGS. 10A-10D and 11A-11B.

Each of the deblocking, SAO, and ALF filters of the in-loop filter 66 or 94 includes one or more in-loop filter coefficients, and the cross component ALF also includes a plurality of cross component filter coefficients. The in-loop and cross component filter coefficients are signaled in an Adaptation Parameter Set (APS). In an example, an APS carries and signals multiple sets (e.g., up to 25 sets) of luma filter coefficients and clipping value indexes, and multiple sets (e.g., up to 8 sets) of chroma filter coefficients and clipping value indexes. The APS is transferred with the video frame 500 in the bitstream from the video encoder 20 to the video encoder 30, i.e., the APS is an overhead of the transfer of the bitstream. In some embodiments, filter coefficients of different classification for luma components of the luma samples 502 are merged to reduce the overhead of the transfer of the bitstream. In an example, the indices of the APS used for an image slice are signaled in a corresponding slice header.

In some embodiments, the cross component filter coefficients are determined and applied on a block level (e.g., on a slice level, on a CTB level) and signaled as a context-coded flag (i.e., a CCALF filer index) for each block of luma and chroma samples. Each block of luma and chroma samples optionally has a variable size. That said, in some embodiments, a plurality of predefined cross component filter coefficient sets are stored in the video encoder 20 and video decoder 30 separately. The video frame 500 is transferred from the video encoder 20 to the video decoder 30 with the context-coded flag. The video decoder 30 identifies a set of predefined cross component filter coefficients from the cross component filter coefficient sets that are stored locally according to the context-coded flag. Conversely, in some embodiments, the cross component filter coefficients are transmitted directly with the APS, and are scaled by a predefined factor (e.g., 26) and rounded to a fixed point representation.

Figure 6A:
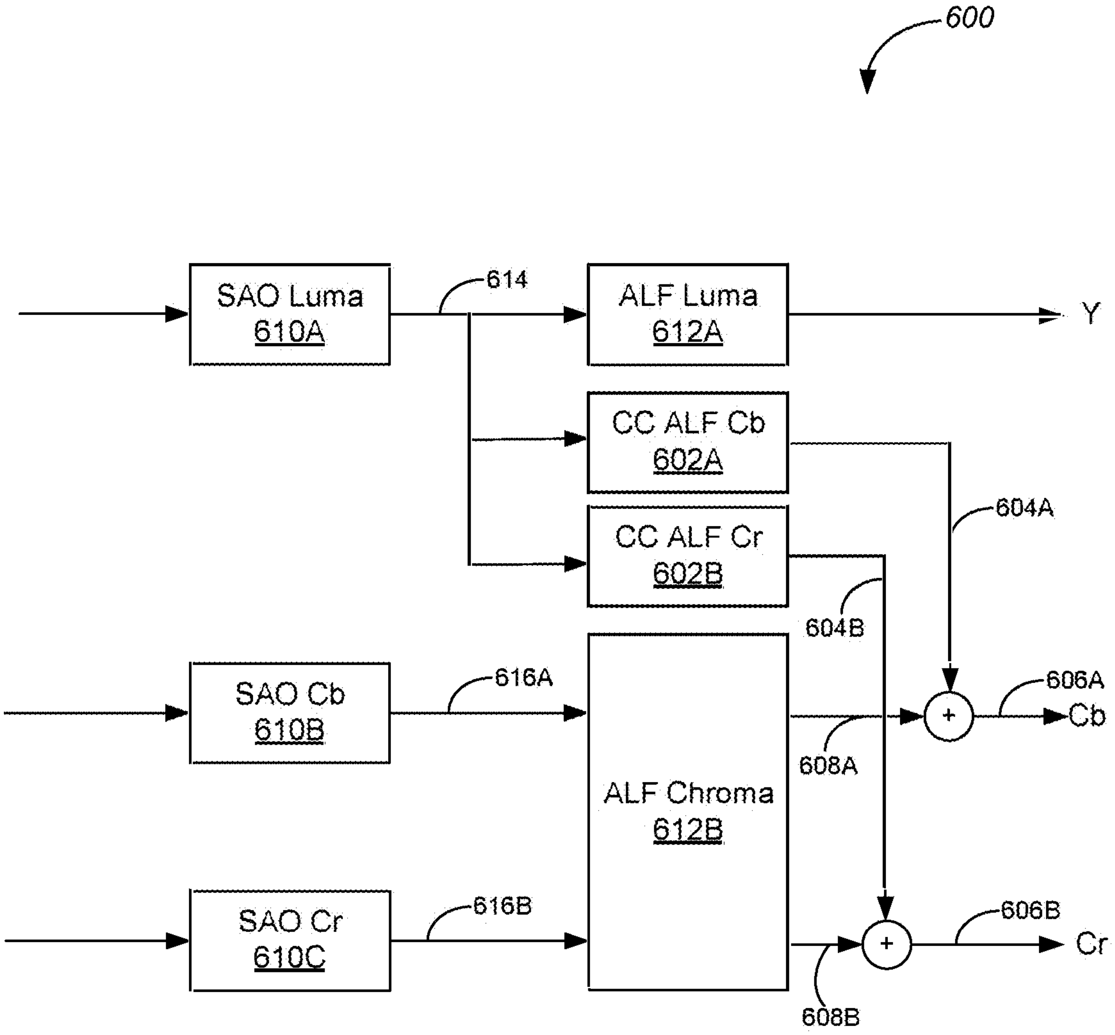
FIG. 6A is a block diagram of an in-loop filter that is applied in a video encoder or decoder and includes a cross component filter, in accordance with some embodiments.
Figure 6B:
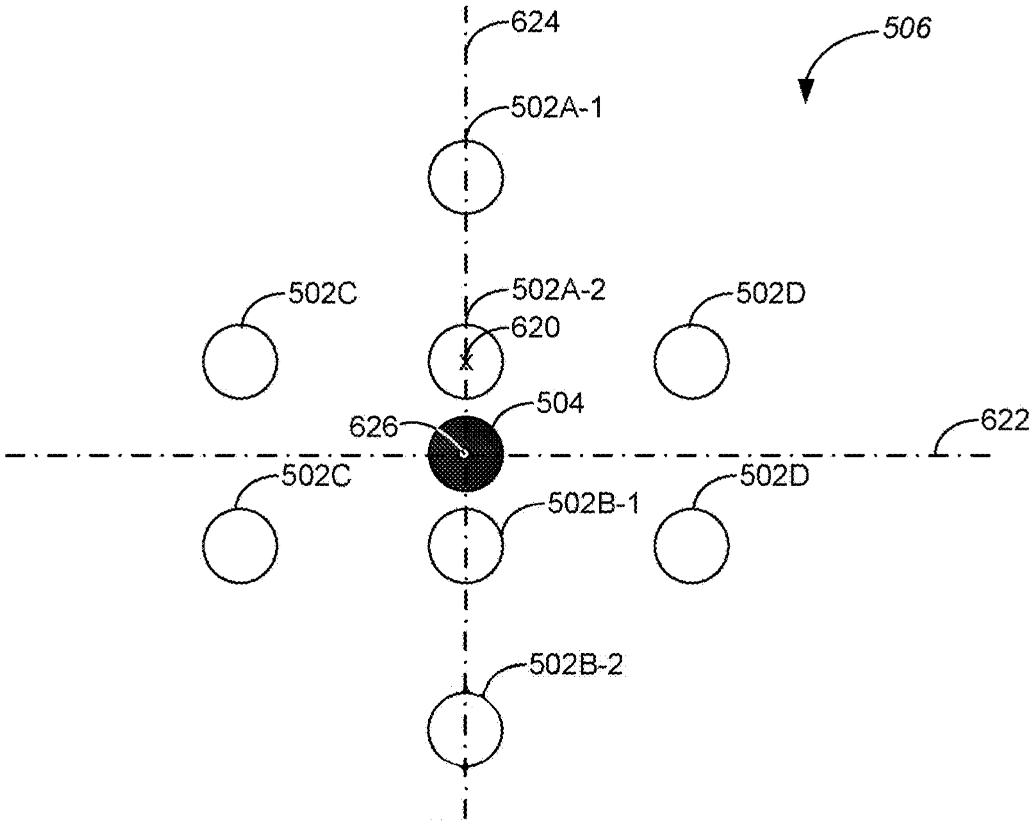
FIG. 6B is a diagram of a pixel group grouping luma samples according to a diamond shape, in accordance with some embodiments.
Figure 6C:
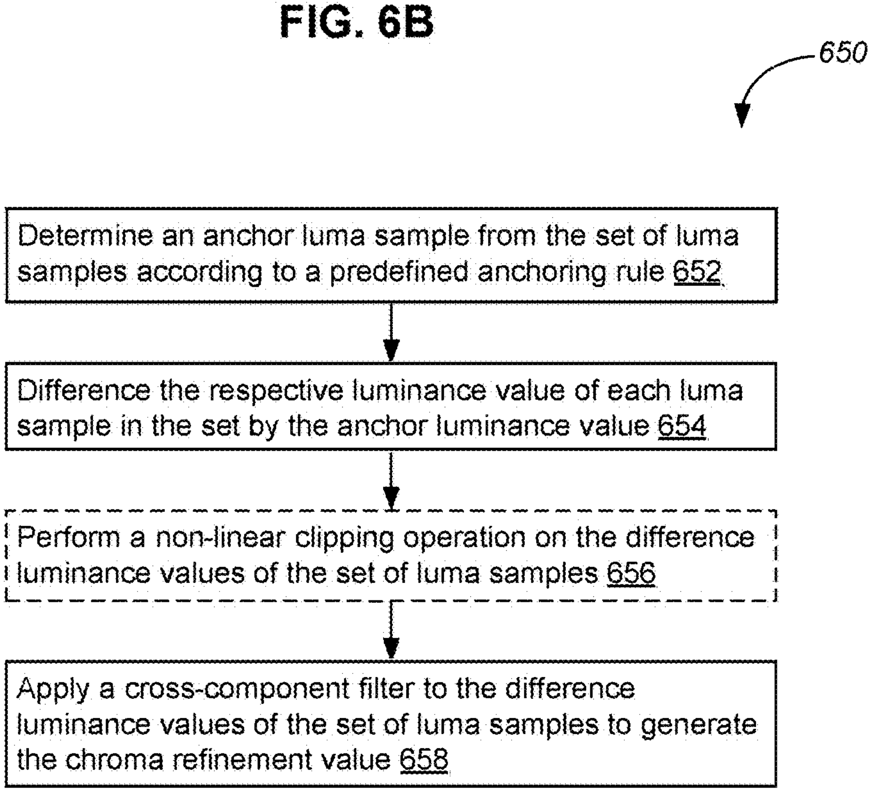
FIG. 6C is a flowchart of a cross component filtering process based on difference luma values of the luma samples, in accordance with some embodiments.

FIG. 6A is a block diagram of an in-loop filter 600 that is applied in a video encoder 20 or decoder 30 and includes a cross component filter 602, in accordance with some embodiments, and FIG. 6B is a diagram of a pixel group 506 grouping luma samples 502 according to a diamond shape, in accordance with some embodiments. FIG. 6C is a flowchart of a cross component filtering process 650 based on difference luma values of the luma samples 502, in accordance with some embodiments. The video encoder 20 or decoder 30 obtains a plurality of luma samples 502 and a plurality of chroma samples 504 corresponding to a plurality of pixel groups 506 of a video frame 500. Each luma sample 502 has a respective luminance value, and each chroma sample 504 has a respective luminance value. Each of the plurality of pixel groups 506 includes a respective chroma sample 504 and a set of luma samples 502 in the respective pixel group 506. The cross component filter 602 is configured to generate a chroma refinement value 604 for the respective chroma sample 504 based on the set of luma samples 502. The respective chroma sample 504 is then updated using the chroma refinement value 604, i.e., a chrominance value of the respective chroma sample 504 is refined with the chroma refinement value 604. The updated respective chroma sample of each pixel group 506 is stored in association with the video frame 500. As such, a refined chrominance value 606 is generated based on the set of luma samples surrounding each chroma sample 504 and stored for the respective chroma sample 504 in the picture buffer 64 or 92.

Each pixel group 506 corresponds to a respective chroma sample 504, and the corresponding set of luma samples 502 are identified for the respective pixel group 506 based on a filter configuration of the cross component filter 602. In an example, the luma samples 502 and chroma samples 504 are arranged according to a subsampling scheme having a ratio equal to 4:1:1 as shown in FIG. 5. Referring to FIG. 6B, in some embodiments, the cross component filter 602 is a linear diamond-shaped filter involving six luma samples 502 that are located at six angles of a hexagon enclosing the chroma sample and two luma samples 502. For each chroma sample 504, each of the set of corresponding luma samples 502 used for its cross component filtering is also used for cross component filtering of one or two chroma samples 504 that are immediately adjacent to the respective chroma sample. Luma sample pairs 502A, 502B, 502C and 502D are also used by chroma samples that are above, below, to the left of, and to the right of the respective chroma sample 504 for cross component filtering, respectively. Alternatively, in some embodiments (FIG. 11A), the cross component filter 602 is a 3×3 filter involving a set of nine luma samples 502. Each luma sample 502 has a location overlapping or immediately adjacent to that of the respective chroma sample 504. Eight of the nine luma samples surround the respective chroma sample 504. Additionally, in some embodiments (FIG. 11B), the cross component filter 602 is a cross-shaped filter involving a set of five luma samples 502. Each luma sample 502 has a location at a center or a tip of a cross shape, and the respective chroma sample 504 overlaps the center of the cross shape.

In some embodiments, the cross component filter 602 includes a first cross component filter 602A and a second cross component filter 602 configured to generate a first refinement value 604A and a second refinement value 604B. Each chroma sample 504 includes a blue-difference chroma component 608A and a red-difference chroma component 608B that are separately updated using the first and second refinement values 604A and 604B to output a first refined chrominance value 606A and a second refined chrominance value 606B, respectively.

The in-loop filter 600 further includes sample adaptive offset (SAO) filters 610 and adaptive loop filters (ALF) 612 coupled to the SAO filters 610. Before the set of luma samples 502 are applied to generate the chroma refinement value 604 for each chroma sample 504, the SAO filters 610 compensates each of the plurality of luma samples 502 and the plurality of chroma samples 504. Specifically, the SAO filters 610A, 620B and 610C compensate the luma samples 502, the blue blue-difference chroma components Cb of the chroma samples 504, and the red-difference chroma components Cr of the chroma samples 504, respectively. Each of the compensated luma samples 614 is updated using a luma ALF 612A based on a set of adjacent luma samples 614, while each of the compensated chroma samples 616A and 616B is updated using a chroma ALF 612B based on a set of adjacent chroma samples 616. In some embodiments, the chroma ALF 612B and the cross component filter 602 are controlled jointly, i.e., are enabled or disabled jointly to generate the chroma components 608 and chroma refinement value 604 concurrently.

Referring to FIG. 6C, in some embodiments, for cross component filtering, an anchor luma sample 620 is determined (652) from the set of luma samples 502 in each pixel group 506 corresponding to a respective chroma sample 504 according to a predefined anchoring rule. The chroma refinement value 604 is generated by differencing (654) the respective luminance value of each luma sample 502 in the set of luma samples 502 by the anchor luminance value and applying (658) the cross component filter 602 to the difference luminance values of the set of luma samples 502. For each chroma sample 504, cross component filtering is represented by the following equation:

$$ChromaR = \sum_{i=0}^{7} f(i) \cdot (Luma(i) - Luma_{Anchor}) \quad (1)$$

where ChromaR is a cross component filtering result of the respective chroma sample 504, f(i) is a cross component filter coefficient corresponding to each of the set of luma samples 502 corresponding to the respective chroma sample 504, Luma(i) is a luminance value of each luma sample 502, and $Luma_{Anchor}$ is the anchor luminance value of the anchor luma sample 620. In some embodiments, a non-linear clipping operation is performed (656) on the difference luminance value of the set of luma samples 502 after the cross component filter 602 is applied. The cross component filtering result (i.e., the refined chrominance value 606) is represented by the following equation:

$$ChromaR = \text{clip}\,(DR, ChromaR) \quad (2)$$

where DR is a dynamic range of the non-linear clipping operation. The dynamic range of the non-linear clipping operation is associated with a bit depth.

Referring to FIG. 6B, in some embodiments, each pixel group 506 has a predefined shape (e.g., a hexagon) that is symmetric with respect to two orthogonal axes 622 and 624 passing a center 626 of the predefined shape. In accordance with the predefined anchoring rule, the anchor luma sample 620 for each pixel group 506 is selected from the set of luma samples 502 and has the closest distance to a center of the respective pixel group than a remainder of the set of luma samples 502. The anchor luma sample 620 is one of two luma samples 502A-2 and 502B-1 that are fully enclosed in the hexagon in FIG. 6B. Alternatively, in some embodiments, in accordance with the predefined anchoring rule, the anchor luma sample 620 for each chroma sample is distinct from the set of luma samples 502, and the anchor luminance value of the anchor luma sample 620 is an average of the luminance values of two or more luma samples 502 in the pixel group 506. For example, the anchor luminance value is an average of the luminance values of the two luma samples 502A-2 and 502B-1 that are closest to the center 626 in the luma samples 502 of the pixel group 506. In another example, the anchor luminance value is an average of the luminance values of all of the luma samples 502 in the pixel group 506.

Figure 7:
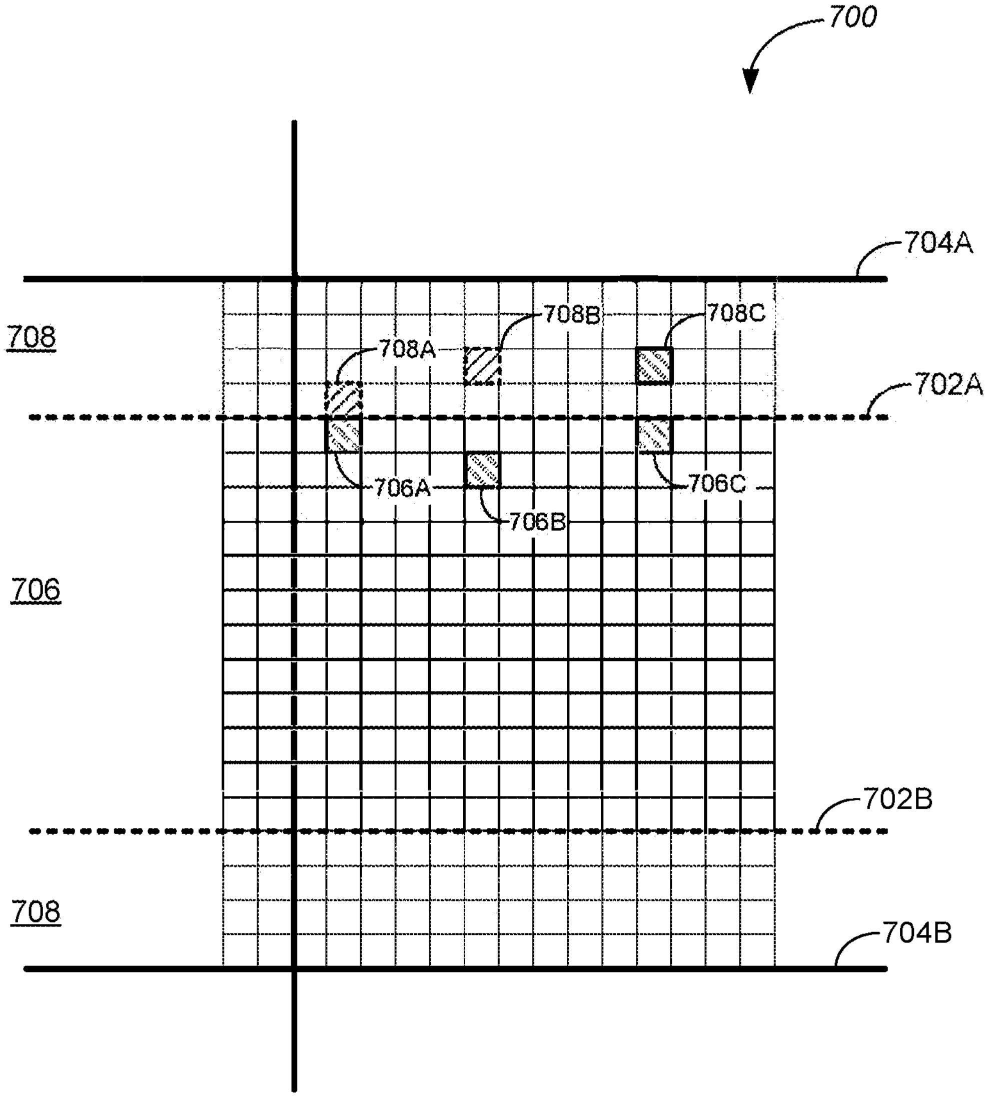
FIG. 7 illustrates an image block stored in a line buffer for video processing, in accordance with some embodiments.

FIG. 7 illustrates an image block 700 stored in a line buffer for video processing, in accordance with some embodiments. An example of the image block 700 is a coding tree unit. Modified block classification and filtering are employed for samples near horizontal boundaries. For this purpose, a virtual boundary 702 is defined as a line by shifting a horizontal boundary 704 with a number (N) of lines of samples. The number is 4 for luma components and 2 for chroma components. For cross component filtering, the virtual boundary 702 is shifted from the horizontal boundary 704 according to a cross component filtering scheme of a cross component filter 602.

Specifically, the image block 700 includes a top virtual boundary 702A and a bottom virtual boundary 702B. Luma and chroma samples between each virtual boundary 702 and the corresponding horizontal boundary 704 are not stored in the line buffer and have to be reproduced from luma and chroma samples that are enclosed between two boundary lines 702A and 702B. Stated another way, a plurality of pixel groups 506 of a video frame 500 includes at least a first subset of pixels 706 and a second subset of pixels 708 immediately adjacent to the first subset of pixels 706. The first subset of pixels 706 and the second subset of pixels 708 are divided by the virtual boundary 702 of the block 700. The first subset of pixels 706 is enclosed in the block by the virtual boundary 702. Luma and chroma samples of the first subset of pixels 706 are available, while luma and chroma samples of the second subset of pixels 708 are not available. Luminance values of the luma samples corresponding to the second subset of pixels 708 are replaced with luminance values of the luma samples corresponding to the first subset of pixels 706.

In some embodiments, the luma sample corresponding to each of the second subset of pixels (e.g., pixels 708A and 708B) is replaced with the luma sample corresponding to a respective pixel (e.g., pixels 706A and 706B) in the first subset of pixels. The respective pixel 706A or 706B of the first subset of pixels and the respective pixel 708A or 708B of the second subset of pixels are symmetric with respect to the virtual boundary 702 of the block 700, respectively. Alternatively, in some embodiments, the luma sample corresponding to each of the second subset of pixels (e.g., pixel 708C) is replaced with the luma sample corresponding to a respective pixel (e.g., pixel 706C) in the first subset of pixels. The respective pixel 706C of the first subset of pixels is the closest pixel to the respective one 708C of the second subset of pixels among the first subset of pixels 706. More details on reproducing the luma and chroma samples of the second subset of pixels 708 are discussed in the context of adaptive loop filtering and cross component filtering below with reference to FIGS. 8A-8G, 9A-9E and 10A-10D.

Figure 8A:
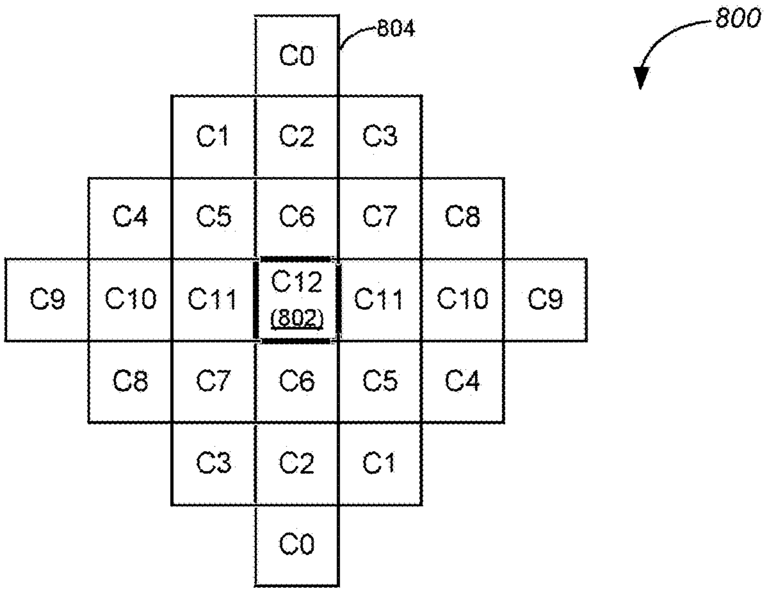
FIG. 8A is an example ALF filtering scheme in which a luma sample is processed from a set of neighboring luma samples by a luma ALF.
Figure 8B:
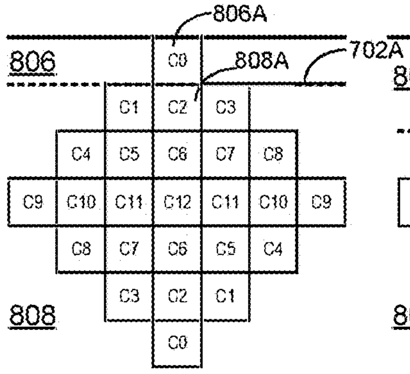
FIGS. 8B-8G are ALF filtering schemes for six luma samples adjacent to a virtual boundary, in accordance with some embodiments.
Figure 8C:
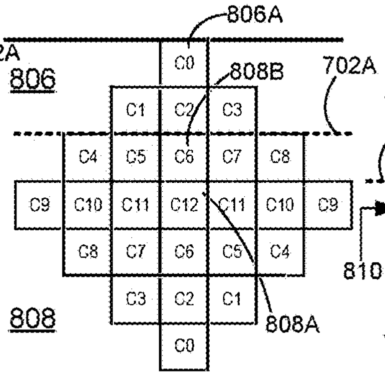

FIG. 8A is an example ALF filtering scheme 800 in which a luma sample 802 is processed from a set of neighboring luma samples 804 by a luma ALF 612A, and FIGS. 8B-8G are ALF filtering schemes for six luma samples adjacent to a virtual boundary 702, in accordance with some embodiments. The luma ALF 612A has a diamond filter shape (e.g., a 7×7 diamond shape) and is selected from a plurality of predefined filters (e.g., 25 filters) for each 4×4 block based on a direction and activity of local gradients. Each square in FIGS. 8A-8G represents a luma sample labelled with a corresponding filter coefficient (C0-C12) of the luma ALF 612A having the diamond shape. For the luma sample 802, a total 13 filter coefficients (C0-C12) are symmetrically applied to combine 25 luma samples using the luma ALF 612A. Modified block classification is applied for the Luma sample 802. For one-dimensional (1D) Laplacian gradient calculation of the 4×4 block below the virtual boundary 702A, only the luma samples 808 below the virtual boundary 702A are used. Similarly, for 1D Laplacian gradient calculation of a 4×4 block above the virtual boundary 702B, only the luma samples above the virtual boundary 702B are used. Quantization of activity value is scaled based on a reduced number of luma samples 808 used in 1D Laplacian gradient calculation.

In some embodiments, a symmetric padding operation at the virtual boundaries 702 is used for both luma and chroma samples 502 and 504 for filtering processing and ALF block classification. When the luma sample 802 being filtered is located below and adjacent to the virtual boundary 702A (e.g., separated from the virtual boundary 702A by two or less lines of samples), one or more neighboring samples 806 that are located above the virtual boundary 702A are padded. Likewise, when the luma sample 802 being filtered is located below the virtual boundary 702B (e.g., separated from the virtual boundary 702B by two or less lines of samples), one or more neighboring samples 806 that are located below the virtual boundary 702B are padded. In some embodiments, this padding process is applied for slice, brick and/or tile boundaries. In some embodiments, for ALF block classification, only the luma samples which are in the same slice, brick or tile are used, and a corresponding activity value is scaled accordingly. In some embodiments, for ALF filtering and ALF block classification, repetitive padding is applied on all boundaries (i.e., picture/sub-picture/slice/tile) excluding ALF virtual boundary.

Stated another way, the plurality of pixel groups 506 of the video frame 500 includes a first subset of pixels and a second subset of pixels immediately adjacent to the first subset of pixels. The first subset of pixels and the second subset of pixels are divided by a virtual boundary 702 of a block 700. The first subset of pixels 706 is enclosed in the block 700 by the virtual boundary 702. Luma samples 808 of the first subset of pixels are available, while the luma samples 806 of the second subset of pixels are not available and need to be generated from the luma samples 808. The luminance values of the luma samples 806 corresponding to the second subset of pixels are replaced with (i.e., duplicated from) luminance values of the luma samples 808 corresponding to the first subset of pixels. Each of the luma samples 806 is duplicated from or replaced by a respective luma sample 808. Optionally, the respective replacing luma sample 808 (e.g., sample 808A) is symmetric with the respective replaced luma sample 806 (e.g., sample 806A) with respect to the virtual boundary 702. Optionally, the respective replacing luma sample 808 (e.g., sample 808B) is closest to the respective replaced luma sample 806 (e.g., sample 806A) among the luma samples 808 corresponding to the first subset of pixels.

Figure 8D:
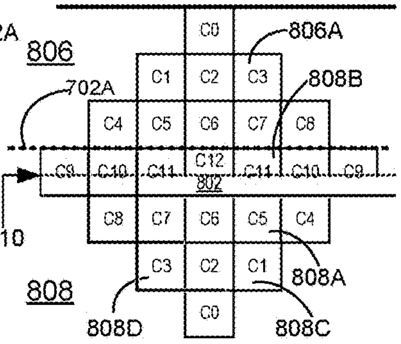
Figure 8E:
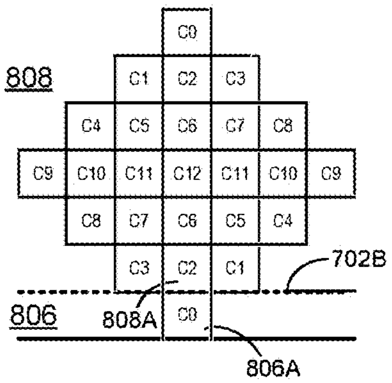
Figure 8F:
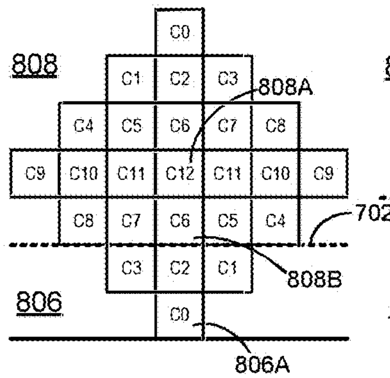
Figure 8G:
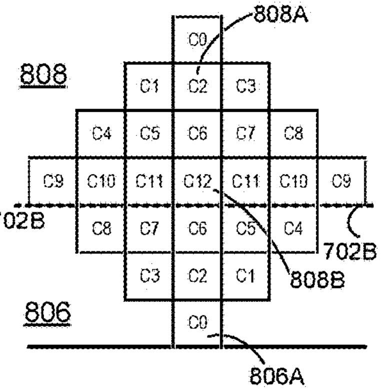

Referring to FIG. 8D, in some embodiments, the respective replacing luma sample 808 (e.g., sample 808C) is symmetric with the respective replaced luma sample 806 (e.g., sample 806A) with respect to a center line 810 of the ALF filtering scheme. Alternatively, in some embodiments, the respective replacing luma sample 808 (e.g., sample 808D) is symmetric with the respective replaced luma sample 806 (e.g., sample 806A) with respect to a center (i.e., sample 802) of the ALF filtering scheme.

Figure 9A:
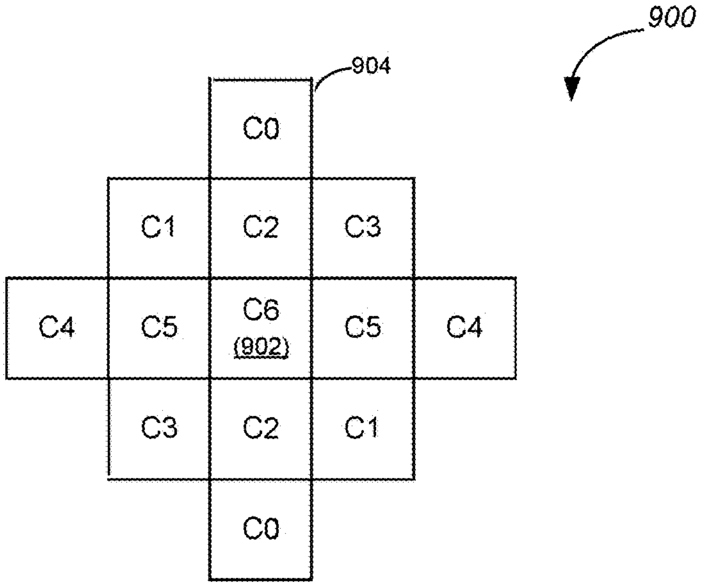
FIG. 9A is an example ALF filtering scheme in which a chroma sample is processed from a set of neighboring samples by a chroma ALF.
Figure 9B:
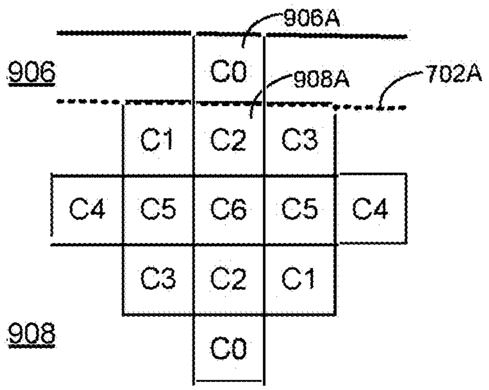
FIGS. 9B-9E are ALF filtering schemes for four chroma samples adjacent to a virtual boundary, in accordance with some embodiments.

FIG. 9A is an example ALF filtering scheme 900 in which a chroma sample 902 is processed from a set of neighboring samples 904 by a chroma ALF 612B, and FIGS. 9B-9E are ALF filtering schemes for four chroma samples adjacent to a virtual boundary 702, in accordance with some embodiments. The chroma ALF 612B has a diamond filter shape (e.g., a 5×5 diamond shape). Each square in FIGS. 9A-9E represents a chroma sample labelled with a corresponding filter coefficient (C0-C6) of the chroma ALF 612B having the diamond shape. For the chroma sample 902, a total 7 filter coefficients (C0-C6) are symmetrically applied to combine 13 chroma samples in the chroma ALF 612B.

As explained above, in some embodiments, symmetric padding operation at the virtual boundaries 702 are used for the chroma samples 504 for filtering processing and ALF block classification. When the chroma sample 902 being filtered is located below and adjacent to the virtual boundary 702A (e.g., separated from the virtual boundary 702A by zero or one line of chroma samples), one or more neighboring samples 906 that are located above the virtual boundary 702A are padded. Likewise, when the chroma sample 902 being filtered is located above and adjacent to the virtual boundary 702B (e.g., separated from the virtual boundary 702B by zero or one line of chroma samples), one or more neighboring samples 906 that are located below the virtual boundary 702B are padded. In some embodiments, this padding process is applied for slice, brick and/or tile boundaries. In some embodiments, for ALF block classification, only the chroma samples which are in the same slice, brick or tile are used, and a corresponding activity value is scaled accordingly. In some embodiments, for ALF filtering and ALF block classification, repetitive padding is applied on all boundaries (i.e., picture/sub-picture/slice/tile) excluding ALF virtual boundary.

Chroma samples 908 of a first subset of pixels are available, and the chroma samples 906 of the second subset of pixels are not available and need to be generated from the chroma samples 908. The chrominance values of the chroma samples 906 corresponding to the second subset of pixels are replaced with chrominance values of the chroma samples 908 corresponding to the first subset of pixels. Each of the chroma samples 906 is duplicated from or replaced by a respective chroma sample 908. Optionally, the respective replacing chroma sample 908 (e.g., sample 908A) is symmetric with the respective replaced chroma sample 906 (e.g., sample 906A) with respect to the virtual boundary 702. Optionally, the respective replacing chroma sample 908 (e.g., sample 908B) is closest to the respective replaced chroma sample 906 (e.g., sample 906A) among the chroma samples 908 corresponding to the first subset of pixels.

Figure 9C:
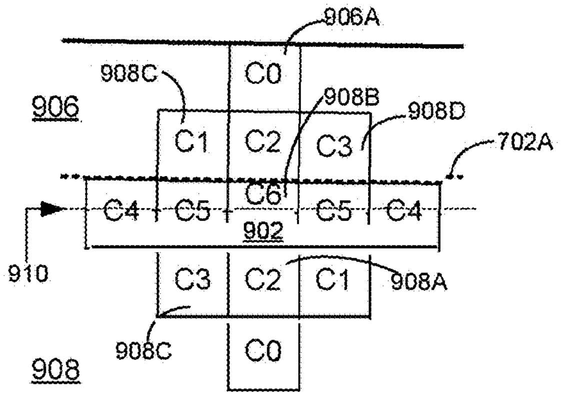
Figure 9D:
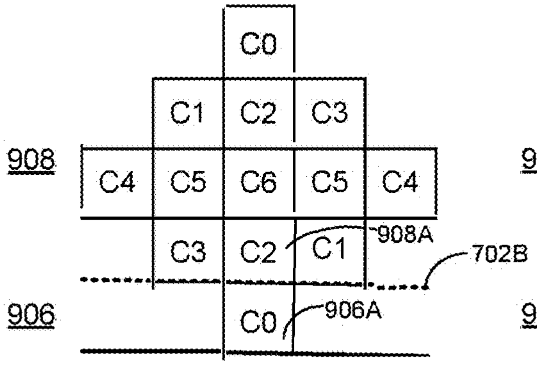
Figure 9E:
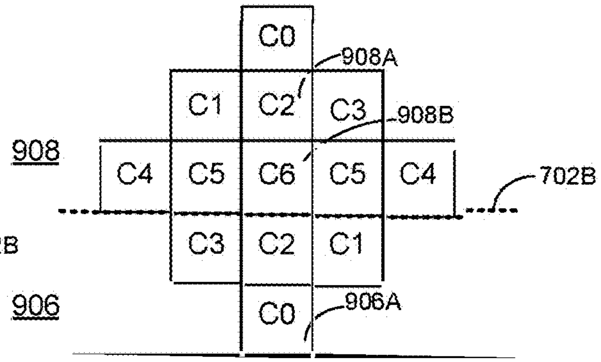

Referring to FIG. 9C, in some embodiments, the respective replacing luma sample 908 (e.g., sample 908C) is symmetric with the respective replaced luma sample 906 (e.g., sample 906C) with respect to a center line 910 of the ALF filtering scheme. Alternatively, in some embodiments, the respective replacing luma sample 908 (e.g., sample 908D) is symmetric with the respective replaced luma sample 906 (e.g., sample 906C) with respect to a center (i.e., sample 902) of the ALF filtering scheme.

FIGS. 10A-10D illustrates example boundary pixel groups 1000, 1020, 1040 and 1060 that apply sample padding for cross component filtering, in accordance with some embodiments. Each open circle represents a luma sample 502 applied to generate a chroma refinement value for a chroma sample 504 represented by a solid circle. In each boundary pixel group, each luma sample 502 is associated with a corresponding filter coefficient (C0-C7) of a cross component filter 602 having a diamond shape. For each chroma sample 504, a total 8 filter coefficients (C0-C7) are applied to combine 8 luma samples in the cross component filer 602. A video frame 500 corresponding to the luma and chroma samples 504 and 504 includes a first subset of pixels and a second subset of pixels that are divided by a virtual boundary 702 of a block 700. The first subset of pixels and the second subset of pixels are divided by a virtual boundary 702 of a block 700. In each pixel group, a first subset of luma samples 502A correspond to the first subset of pixels and are available for use, and a second subset of luma samples 502B correspond to the second subset of pixels and are not available. The virtual boundary 702 is parallel with one of the two orthogonal axes 622 and 624 of each pixel group. For cross component filtering, luminance values of the luma samples 502B corresponding to the second subset of pixels are replaced with or duplicated from luminance values of the luma samples 502A corresponding to the first subset of pixels.

Figure 10A:
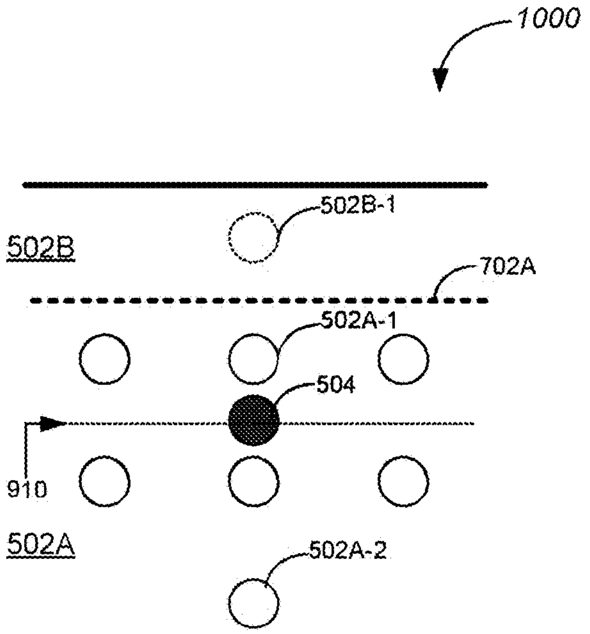
FIGS. 10A-10D illustrates example boundary pixel groups that apply sample padding for cross component filtering, in accordance with some embodiments.
Figure 10B:
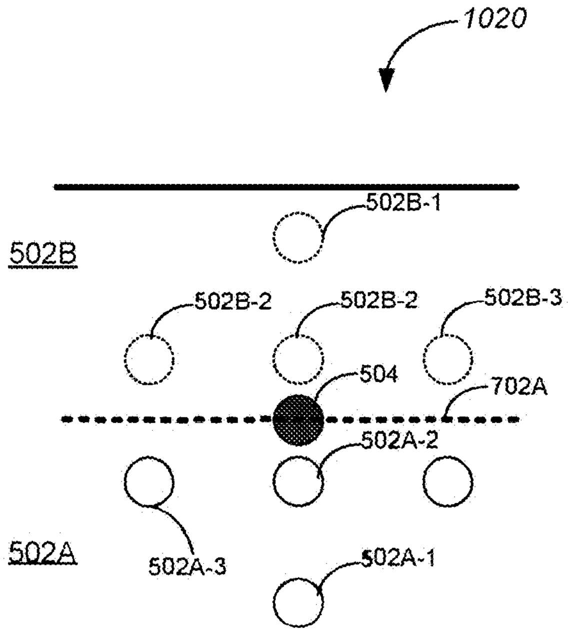
Figure 10C:
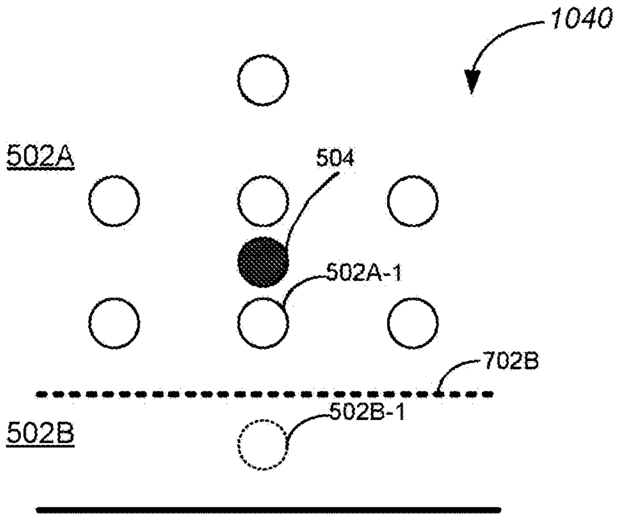
Figure 10D:
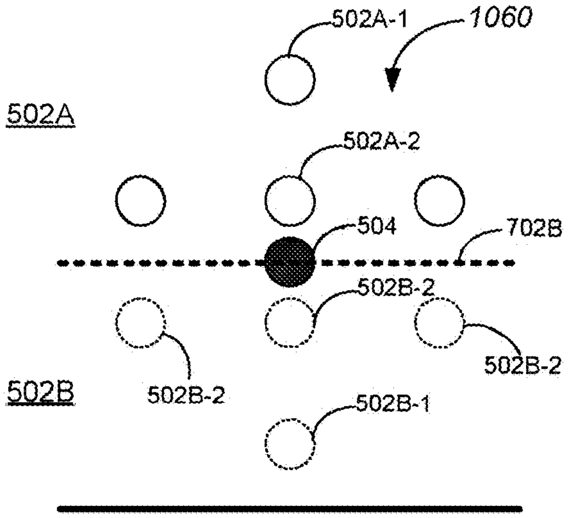

Referring to FIGS. 10B and 10D, in some embodiments, each of the second subset of luma samples (e.g., 502B-1) is replaced with a respective luma sample (e.g., 502A-1) that is symmetric with the respective luma sample (e.g., 502B-1) with respect to the virtual boundary 702. Alternatively, in some embodiments, each of the second subset of luma samples (e.g., 502B-1) is replaced with a respective luma sample (e.g., 502A-2) that is closest to the respective luma sample (e.g., 502B-1) among the first subset of luma samples 502A. In FIGS. 10B and 10D, the luma sample 502A-1 that is symmetric with the respective luma sample 502B-1 is distinct from the luma sample 502A-2 that is closest to the respective luma sample 502B-1. Conversely, each of the luma samples 502B-2 and 502B-3 is duplicated from the same respective luma sample, independently of whether the same respective luma sample is chosen based on a symmetry with respect to the virtual boundary 702 or a distance from the respective luma sample 502B-2 or 502B-3.

Alternatively, in some embodiments, the respective replacing luma sample 502A (e.g., sample 502A-2 in FIG. 10A) is symmetric with the respective replaced luma sample 502B (e.g., sample 502B-1 in FIG. 10A) with respect to a center line 1002 of the pixel group. Alternatively, in some embodiments, the respective replacing luma sample 502A (e.g., sample 502A-3) is symmetric with the respective replaced luma sample 502B (e.g., sample 502B-3) with respect to a center (i.e., chroma sample 504) of the pixel group.

After each of the second subset of luma samples 502B is replaced with a respective luma sample 502A, an anchor luma sample is determined from the luma samples 502A and 502B according to a predefined anchoring rule. The chroma refinement value of the chroma sample 504 is generated by differencing the respective luminance value of each luma sample 502A or 502B by an anchor luminance value of the anchor luma sample and applying the cross component filter 602 to the difference luminance values of the set of luma samples 502 to generate the chroma refinement value 604. As such, the chroma sample 504 is updated using the chroma refinement value 604.

In some embodiments, the above padding process for cross component filtering is applied for slice, brick and/or tile boundaries. In some embodiments, only the chroma samples which are in the same slice, brick or tile are used, and a corresponding activity value is scaled accordingly. In some embodiments, repetitive padding is applied on all boundaries (i.e., picture/sub-picture/slice/tile) excluding ALF virtual boundary.

Figure 11A:
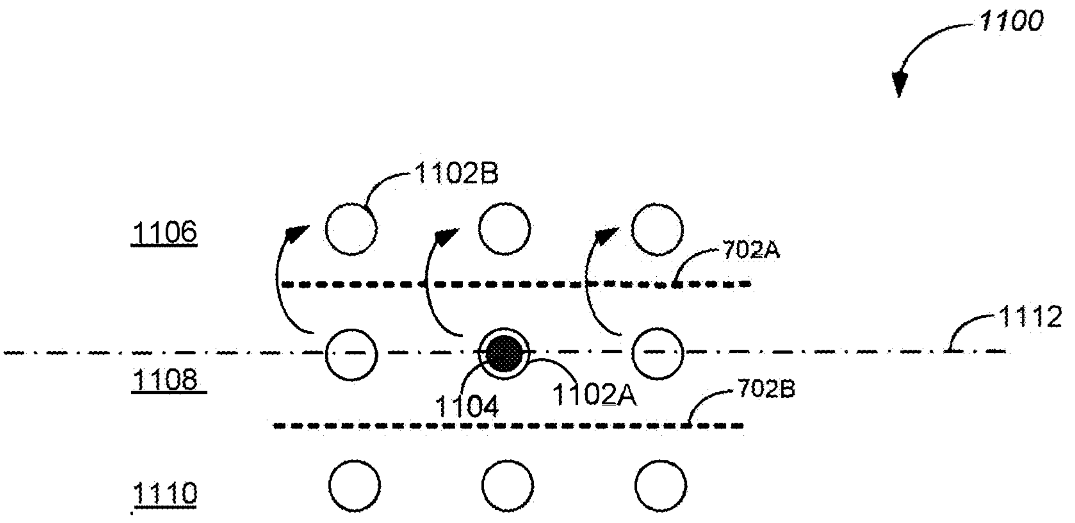
FIGS. 11A and 11B are schematic diagrams of two additional example cross component filtering schemes and of a cross component filter, in accordance with some embodiments.
Figure 11B:
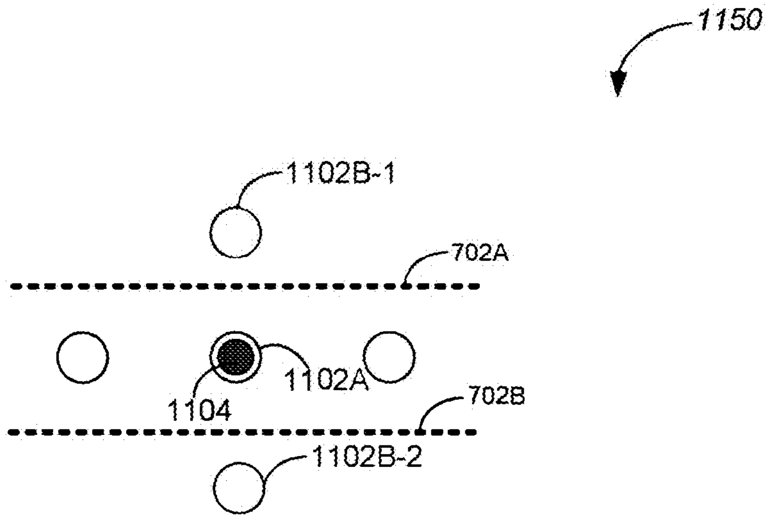

FIGS. 11A and 11B are schematic diagrams of two additional example cross component filtering schemes 1100 and 1150 of a cross component filter 602, in accordance with some embodiments. Each open circle represents a luma sample 1102 applied to generate a chroma refinement value 604 for a chroma sample 1104 represented by a solid circle. In each cross component filtering scheme 1100 or 1150, each luma sample 502 is associated with a corresponding filter coefficient of the cross component filter 602, and the chroma sample 1104 modified based on a linear combination of the luma samples 1102 in the same pixel group. Specifically, difference luminance values of the luma samples 1102 in the pixel group are combined to generate a chroma refinement value 604 to update the chroma sample 1104.

Referring to FIG. 11A, the chroma sample 1104 overlaps a central luma sample 1102A and is surrounded by eight peripheral luma samples 1102B. The solid circle overlaps with one of the open circles at a center of the pixel group. An anchor luma sample is selected as one of the luma samples 1102 (e.g., the central luma sample 1102A) or derived from a subset or all of the luma samples 1102. For example, the anchor luma sample is an average of all nine luma samples 1102 or an average of eight peripheral luma samples 1102B. An anchor luminance value is deducted from a respective luminance value of each of the luma samples 1102 to provide the difference luminance values of the luma samples 1102. The cross component filter 602 applies a set of filter coefficients to filter the difference luminance values of the luma samples 1102 and generate the chroma refinement value 604 for the chroma sample 1104.

In some situations, the chroma sample 1104 is adjacent to a virtual boundary 702 of a block 700 stored in a line buffer, and the virtual boundary 702 divides the luma samples 1102 in the pixel group into a first subset of luma samples and a second subset of luma samples. For example, a first row 1106 of the luma samples 1102 is above a top virtual boundary 702A and not stored in the line buffer, while a second row 1108 and a third row 1110 of luma samples 1102 are stored therein. The first row 1106 of luma samples are replaced by the second row 1108 of luma samples for the purposes of generating the chroma refinement value 604. Alternatively, in another example, the third row 1110 of the luma samples 1102 is below a bottom virtual boundary 702B and not stored in the line buffer, while the first row 1106 and the second row 1108 of luma samples 1102 are stored therein. The third row 1110 of luma samples are replaced by the second row 1108 of luma samples for the purposes of generating the chroma refinement value 604. Additionally, in some embodiments, one of the first and third rows of luma samples is beyond the virtual boundary 702 and not stored in the line buffer, but is replaced by the other one of these two rows that is stored in the line buffer, because the first and third rows 1106 and 1110 are symmetric with respect to a symmetry axis 1112 of the cross component filtering scheme 1100.

Referring to FIG. 11B, the chroma sample 1104 overlaps a central luma sample 1102A and is surrounded by four peripheral luma samples 1102B that are above, below, to the left of, and to the right of the central luma sample 1102A. An anchor luma sample is selected as one of the luma samples 1102 (e.g., the central luma sample 1102A) or derived from a subset or all of the luma samples 1102. For example, the anchor luma sample is an average of all five luma samples 1102 or an average of four peripheral luma samples 1102B. In some situations, the chroma sample 1104 is adjacent to a virtual boundary 702 of a block 700 stored in a line buffer. For example, a top luma sample 1102B-1 is above a top virtual boundary 702A and not stored in the line buffer, and is reproduced from one of the central luma sample 1102A and a bottom luma sample 1102B-2. In another example, the bottom luma sample 1102B-2 is below a bottom virtual boundary 702B and not stored in the line buffer, and therefore, is reproduced from one of the central luma sample 1102A and the top luma sample 1102B-1. After all luma samples 1102 are available in the pixel group 506, an anchor luma sample is identified and difference luminance values are determined for the luma samples 1102, thereby allowing the chroma sample 1104 to be modified based on these luma samples 1102 using the cross component filter 602.

Figure 12:
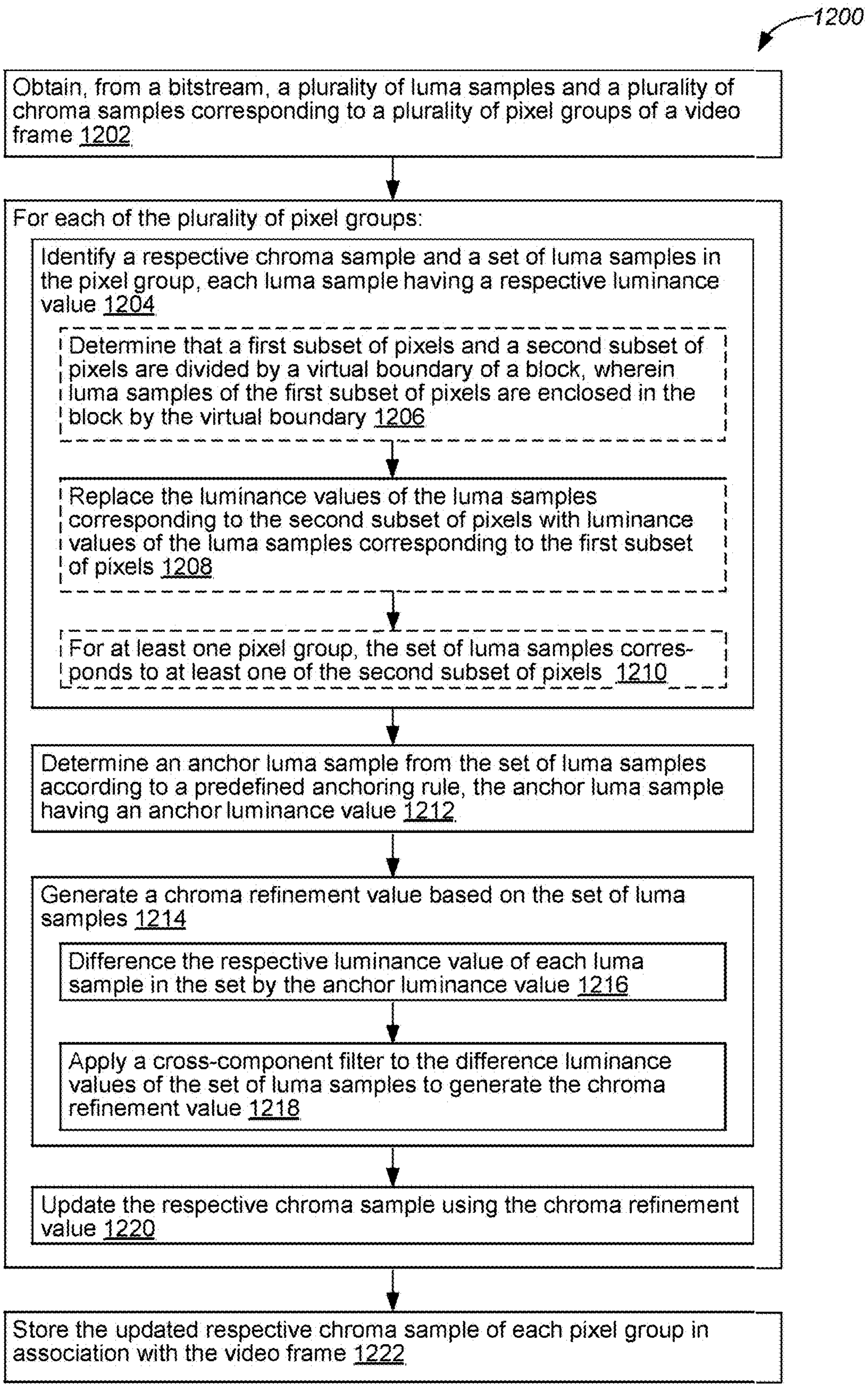
FIG. 12 is a flow chart of a video coding method, in accordance with some embodiments.

FIG. 12 is a flow chart of a video coding method 1200, in accordance with some embodiments. The video coding method 1200 is implemented in an electronic device having a video encoder or decoder. The electronic device obtains (1202) a plurality of luma samples 502 and a plurality of chroma samples 504 corresponding to a plurality of pixel groups 506 of a video frame 500 in a bitstream. For each of the plurality of pixel groups 506, a respective chroma sample 504 and a set of luma samples 502 are identified (1204) in the pixel group. Each luma sample 502 has a respective luminance value. An anchor luma sample 620 is determined (1212) from the set of luma samples 502 in each pixel group 506 according to a predefined anchoring rule. The anchor luma sample 620 has an anchor luminance value. The electronic device generates (1214) a chroma refinement value 604 based on the set of luma samples 502 by differencing (1216) the respective luminance value of each luma sample 502 in the set by the anchor luminance value and applying (1218) a cross component filter 602 to the difference luminance values of the set of luma samples 502 to generate the chroma refinement value. In some embodiments, a non-linear clipping operation is performed on the difference luminance values of the set of luma samples 502 prior to applying the cross component filter 602. The respective chroma sample is updated (1220) using the chroma refinement value. The electronic device stores (1222) the updated respective chroma sample 504 of each pixel group 506 in association with the video frame 500.

In some embodiments, the plurality of pixel groups 506 includes a first subset of pixels 706 and a second subset of pixels 708 immediately adjacent to the first subset of pixels 706. The electronic device determines (1206) that the first subset of pixels 706 and the second subset of pixels 708 are divided by a virtual boundary 702 of a block 700 (e.g., a coding tree unit). The first subset of pixels and the second subset of pixels are divided by a virtual boundary 702 of a block 700. Luma samples of the first subset of pixels 706 are available (e.g., stored with the block 700) and immediately adjacent to the virtual boundary 702 of the block 700, and luma samples of the second subset of pixels 708 are not available (e.g., not stored with the block 700). The luminance values of the luma samples corresponding to the second subset of pixels 708 are replaced (1208) with luminance values of the luma samples corresponding to the first subset of pixels 706. In some embodiments, the luma sample corresponding to each of the second subset of pixels 708 is replaced with the luma sample corresponding to a respective pixel in the first subset of pixels 706, and the respective pixel of the first subset of pixels 706 is the closest pixel to the respective one of the second subset of pixels 708 among the first subset of pixels 706. Alternatively, in some embodiments, the luma sample corresponding to each of the second subset of pixels 708 is replaced with the luma sample corresponding to a respective pixel in the first subset of pixels 706, and the respective pixel of the first subset of pixels 706 and the respective one of the second subset of pixels 708 are symmetric with respect to the virtual boundary 702 of the block 700. For at least one pixel group 506, the set of luma samples 502 corresponds (1210) to at least one of the second subset of pixels. That said, in some embodiments, for the at least one pixel group 506, the chroma refinement value is generated based on the luminance value of the replaced luma sample corresponding to at least one of the second subset of pixels 708.

Further, in some embodiments, each pixel group 506 includes a set of pixels located according to a predefined shape that is symmetric with respect to two orthogonal axes 622 and 624 passing a center 626 of the predefined shape. For each pixel group 506, each of the set of luma samples 502 in the pixel group 506 corresponds to a respective pixel in the pixel group. The virtual boundary 702 of the block 700 is parallel with one of the two orthogonal axes 622 and 624.

In some embodiments, in accordance with the predefined anchoring rule, the anchor luma sample 620 for each pixel group 506 is selected from the set of luma samples 502 and has the closest distance to a center 626 of the respective pixel group 506 than a remainder of the set of luma samples 502. Alternatively, in some embodiments, in accordance with the predefined anchoring rule, the anchor luma sample 620 for each pixel group 506 is distinct from the set of luma samples 502, and the anchor luminance value of the anchor luma sample 620 is an average of the luminance values of two or more luma samples 502.

In some embodiments, for each chroma sample 504, the chroma refinement value 604 includes a first refinement value 604A and a second refinement value 604B. Each chroma sample 504 includes a blue-difference chroma component 608A and a red-difference chroma component 608B that are separately updated using the first and second refinement values 604A and 604B, respectively.

In some embodiments, each pixel group 506 includes a set of pixels located according to a predefined shape, and each of the set of luma samples 502 corresponds to a respective pixel in the respective pixel group 506. Further, in some embodiments, for each pixel group 506, the chroma sample 504 corresponding to the pixel group 506 is presumed to be located at a center 626 of the predefined shape. Additionally, in some embodiments, the predefined shape is a diamond shape, and the set of luma samples 502 includes eight luma samples 502 that are organized according to the diamond shape.

In some embodiments, the luma samples 502 and chroma samples 504 comply with a subsampling scheme having a three-part ratio equal to 4:1:1. For each pixel group 506, the respective chroma sample 504 corresponds to four whole luma samples 502 on average, and has a blue-difference chroma component Cb and a red-difference chroma component Cr.

In some embodiments, the cross component filter 602 includes a linear, diamond shaped filter configured to combine the difference luminance values of the set of luma samples 502 surrounding each chroma sample 504 in a linear manner.

In some embodiments, prior to applying the luma samples 502 to generate the chroma refinement value for each chroma sample 504, the electronic device compensates each of the plurality of luma samples 502 and the plurality of chroma samples 504 using a sample adaptive offset (SAO) filter and updates each of the compensated chroma samples 504 using a chroma adaptive in-loop filter 612B. Further, in some embodiments, the cross component filter 602 and the chroma adaptive in-loop filter 612B are controlled jointly.

In some embodiments, for each of the plurality of luma samples 502, a filtered luma sample 502 is generated from the respective luma sample 502 using a luma adaptive in-loop filter 612A.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method for encoding video data, comprising:

obtaining a plurality of luma samples and a plurality of chroma samples corresponding to a plurality of pixel groups of a video frame; and for each of the plurality of pixel groups:

identifying a respective chroma sample and a set of luma samples corresponding to the pixel group, each luma sample having a respective luminance value;

determining an anchor luma sample according to a predefined rule, the anchor luma sample having an anchor luminance value;

generating a chroma refinement value based on the set of luma samples, including (1) obtaining a difference between the respective luminance value of each luma sample in the set of luma samples and the anchor luminance value, (2) applying a cross component filter to differences corresponding to the set of luma samples to obtain a cross component filtering result, and (3) performing a non-linear clipping operation to generate the chroma refinement value based on the cross component filtering result; and deriving a value of the respective chroma sample using the chroma refinement value.

2. The method of claim 1, wherein the plurality of pixel groups includes a first subset of pixels and a second subset of pixels immediately adjacent to the first subset of pixels, the method further comprising:

determining the first subset of pixels and the second subset of pixels separated by a virtual boundary of a block, the first subset of pixels being enclosed in the block; and determining a luminance value of a luma sample corresponding to one of the second subset of pixels as a luminance value of a luma sample of a respective pixel in the first subset of pixels.

3. The method of claim 2, wherein the respective pixel of the first subset of pixels is the closest pixel to a respective one of the second subset of pixels among the first subset of pixels.

4. The method of claim 2, wherein for at least one pixel group, the chroma refinement value is generated based on the determined luminance value of the luma sample corresponding to at least one of the second subset of pixels.

5. The method of claim 2, wherein:

each pixel group includes a set of pixels located according to a predefined shape that is symmetric with respect to two orthogonal axes passing a center of the predefined shape;

for each pixel group, each of the set of luma samples corresponds to a respective pixel in the pixel group; and the virtual boundary of the block is parallel with one of the two orthogonal axes;

wherein the block is a coding tree block (CTB).

6. The method of claim 1, wherein:

for each chroma sample, the chroma refinement value is a first refinement value or a second refinement value; and each chroma sample corresponds to a blue-difference chroma component which is derived using the first refinement value or a red-difference chroma component which is derived using the second refinement value.

7. The method of claim 1, wherein each pixel group includes a set of pixels located according to a predefined shape, and each of the set of luma samples corresponds to a respective pixel in a respective pixel group;

wherein for each pixel group, the chroma sample corresponding to the pixel group is located at a center of the predefined shape; and wherein the predefined shape is a diamond shape.

8. The method of claim 1, further comprising, prior to generating the chroma refinement value:

compensating each of the plurality of luma samples and the plurality of chroma samples using a sample adaptive offset (SAO) filter; and modifying each of the compensated chroma samples using a chroma adaptive in-loop filter.

9. The method of claim 1, further comprising:

for each of the plurality of luma samples, generating a filtered luminance value of the luma sample from luminance values of respective luma samples using a luma adaptive in-loop filter.

10. The method of claim 1, wherein the luma samples and chroma samples comply with a subsampling scheme having a three-part ratio equal to 4:2:2 or 4:4:4.

11. An electronic device, comprising:

one or more processors; and a memory having instructions stored thereon, which, when executed by the one or more processors, cause the one or more processors to perform operations comprising:

obtaining a plurality of luma samples and a plurality of chroma samples corresponding to a plurality of pixel groups of a video frame; and for each of the plurality of pixel groups:

identifying a respective chroma sample and a set of luma samples corresponding to the pixel group, each luma sample having a respective luminance value;

determining an anchor luma sample according to a predefined rule, the anchor luma sample having an anchor luminance value;

generating a chroma refinement value based on the set of luma samples, including (1) obtaining a difference between the respective luminance value of each luma sample in the set of luma samples and the anchor luminance value, (2) applying a cross component filter to differences corresponding to the set of luma samples to obtain a cross component filtering result, and (3) performing a non-linear clipping operation to generate the chroma refinement value based on the cross component filtering result; and deriving a value of the respective chroma sample using the chroma refinement value.

12. A method for decoding video data, comprising:

obtaining, from a bitstream, a plurality of luma samples and a plurality of chroma samples corresponding to a plurality of pixel groups of a video frame, wherein the video frame is partitioned into a plurality of coding blocks; and for each of the plurality of pixel groups:

identifying a respective chroma sample and a set of luma samples corresponding to the pixel group, each luma sample having a respective luminance value;

determining an anchor luma sample according to a predefined rule, the anchor luma sample having an anchor luminance value;

generating a chroma refinement value based on the set of luma samples, including (1) obtaining a difference between the respective luminance value of each luma sample in the set of luma samples and the anchor luminance value, (2) applying a cross component filter to differences corresponding to the set of luma samples to obtain a cross component filtering result, and (3) performing a non-linear clipping operation to generate the chroma refinement value based on the cross component filtering result; and deriving a value of the respective chroma sample using the chroma refinement value.

13. The method of claim 12, wherein the plurality of pixel groups includes a first subset of pixels and a second subset of pixels immediately adjacent to the first subset of pixels, the method further comprising:

determining the first subset of pixels and the second subset of pixels separated by a virtual boundary of a block, the first subset of pixels being enclosed in the block; and determining a luminance value of a luma sample corresponding to one of the second subset of pixels as a luminance value of a luma sample of a respective pixel in the first subset of pixels.

14. The method of claim 13, wherein the respective pixel of the first subset of pixels is the closest pixel to a respective one of the second subset of pixels among the first subset of pixels; and wherein for at least one pixel group, the chroma refinement value is generated based on the determined luminance value of the luma sample corresponding to at least one of the second subset of pixels.

15. The method of claim 13, wherein:

each pixel group includes a set of pixels located according to a predefined shape that is symmetric with respect to two orthogonal axes passing a center of the predefined shape;

for each pixel group, each of the set of luma samples corresponds to a respective pixel in the pixel group; and the virtual boundary of the block is parallel with one of the two orthogonal axes;

wherein the block is a coding tree block (CTB).

16. The method of claim 12, wherein:

for each chroma sample, the chroma refinement value is a first refinement value or a second refinement value; and each chroma sample corresponds to a blue-difference chroma component which is derived using the first refinement value or a red-difference chroma component which is derived using the second refinement value.

17. The method of claim 12, further comprising:

prior to generating the chroma refinement value: compensating each of the plurality of luma samples and the plurality of chroma samples using a sample adaptive offset (SAO) filter, and modifying each of the compensated chroma samples using a chroma adaptive in-loop filter;

and/or, the method further comprising:

for each of the plurality of luma samples, generating a filtered luminance value of the luma sample from luminance values of respective luma samples using a luma adaptive in-loop filter.

18. The method of claim 12, wherein the luma samples and chroma samples comply with a subsampling scheme having a three-part ratio equal to 4:2:2 or 4:4:4.

19. A method of storing a bitstream, comprising:

generating the bitstream by performing an encoding method; and storing the bitstream on a non-transitory computer readable storage medium, wherein the bitstream is to be decoded by the method according to claim 12; and wherein the encoding method comprises:

obtaining a plurality of luma samples and a plurality of chroma samples corresponding to a plurality of pixel groups of a video frame; and for each of the plurality of pixel groups:

identifying a respective chroma sample and a set of luma samples corresponding to the pixel group, each luma sample having a respective luminance value;

determining an anchor luma sample according to a predefined rule, the anchor luma sample having an anchor luminance value;

generating a chroma refinement value based on the set of luma samples, including (1) obtaining a difference between the respective luminance value of each luma sample in the set of luma samples and the anchor luminance value, (2) applying a cross component filter to differences corresponding to the set of luma samples to obtain a cross component filtering result, and (3) performing a non-linear clipping operation to generate the chroma refinement value based on the cross component filtering result; and deriving a value of the respective chroma sample using the chroma refinement value.

20. The method of claim 19, wherein the luma samples and chroma samples comply with a subsampling scheme having a three-part ratio equal to 4:2:2 or 4:4:4.

* * * * *